(12) United States Patent
Sebastian et al.

(10) Patent No.: US 7,765,698 B2
(45) Date of Patent: Aug. 3, 2010

(54) METHOD OF MAKING ELECTRET ARTICLES BASED ON ZETA POTENTIAL

(75) Inventors: John M. Sebastian, Oakdale, MN (US); Marvin E. Jones, Grant, MN (US); Fuming B. Li, Woodbury, MN (US); Shih-Hung Chou, Maplewood, MN (US); Nathan E. Schultz, Lakeland, MN (US); Justin L. Keough, Vadnais Heights, MN (US); Rahul R. Shah, Woodbury, MN (US); Daniel A. Japuntich, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 224 days.

(21) Appl. No.: 12/131,770

(22) Filed: Jun. 2, 2008

(65) Prior Publication Data

US 2009/0293279 A1 Dec. 3, 2009

(51) Int. Cl.
*B23P 15/16* (2006.01)
*B01D 21/00* (2006.01)
*B01L 9/00* (2006.01)

(52) U.S. Cl. .................. 29/896.62; 29/825; 210/490; 210/500.21; 210/506; 422/101; 427/393.5; 427/407.1; 428/354; 428/357; 435/286.5; 435/288.6; 442/63; 442/164; 442/357; 442/365; 521/27; 521/30; 528/422

(58) Field of Classification Search .................. 29/825, 29/896.62; 521/27, 30; 528/422; 435/286.5, 435/288.6; 422/101; 427/393.5, 407.1; 428/354, 428/357; 442/357, 63, 164, 365; 210/490, 210/506, 500.21

See application file for complete search history.

(56) References Cited

U.S. PATENT DOCUMENTS 2,204,705 A    6/1940 Scofield (Continued)

FOREIGN PATENT DOCUMENTS

JP    55-53410    4/1980

(Continued)

OTHER PUBLICATIONS

P.W. Chudleigh, *Mechanism of charge transfer to a polymer surface by a conducting liquid contact*, 47 J. Appl. Phys., pp. 4475-4483 (Oct. 1976).

(Continued)

*Primary Examiner*—C. J Arbes
(74) *Attorney, Agent, or Firm*—Karl G. Hanson

(57) ABSTRACT

A method of making an electret article, from a polymeric article that has a zeta potential of greater than or less than −7.5 millivolts. The article is charged by contacting it with an aqueous liquid that has a pH and conductivity as follows: (i) if the article has a zeta potential of −7.5 mV or less, then the contacting liquid has pH greater than 7 and a conductivity of 5 to 9,000 microSiemens per centimeter; and (ii) if the article has a zeta potential of greater than −7.5 mV, then the contacting liquid has a pH of 7 or less and a conductivity of 5 to 5,500 microSiemens per centimeter. An electret article made in this manner can provide improved electret performance, particularly in electret filtration articles.

22 Claims, 3 Drawing Sheets

U.S. PATENT DOCUMENTS

| | | | |
|---|---|---|---|
| 3,070,573 A * | 12/1962 | Beck | 525/244 |
| 3,309,222 A * | 3/1967 | Caldwell | 428/480 |
| 3,971,373 A | 7/1976 | Braun | |
| 3,988,157 A * | 10/1976 | Van Paesschen et al. | 430/535 |
| 3,998,916 A | 12/1976 | van Turnhout | |
| 4,016,375 A | 4/1977 | van Turnhout | |
| 4,029,582 A * | 6/1977 | Ishii et al. | 210/500.33 |
| 4,049,870 A * | 9/1977 | Brodmann | 442/104 |
| 4,100,324 A | 7/1978 | Anderson et al. | |
| 4,118,531 A | 10/1978 | Hauser | |
| 4,178,157 A | 12/1979 | van Turnhout et al. | |
| 4,215,682 A | 8/1980 | Kubik et al. | |
| 4,238,193 A * | 12/1980 | Kisaichi et al. | 8/115.59 |
| 4,264,750 A | 4/1981 | Anand et al. | |
| RE30,782 E | 10/1981 | van Turnhout | |
| 4,375,718 A | 3/1983 | Wadsworth et al. | |
| RE31,285 E | 6/1983 | van Turnhout et al. | |
| 4,429,001 A | 1/1984 | Kolpin et al. | |
| 4,508,781 A | 4/1985 | Yagi et al. | |
| 4,523,995 A * | 6/1985 | Pall et al. | 210/504 |
| 4,536,440 A | 8/1985 | Berg | |
| 4,547,420 A | 10/1985 | Krueger et al. | |
| 4,557,945 A | 12/1985 | Yagi et al. | |
| 4,588,537 A | 5/1986 | Klaase et al. | |
| RE32,171 E | 6/1986 | van Turnhout | |
| 4,592,815 A | 6/1986 | Nakao | |
| 4,617,124 A * | 10/1986 | Pall et al. | 210/638 |
| 4,617,390 A | 10/1986 | Hoppe et al. | |
| 4,652,282 A | 3/1987 | Ohmori et al. | |
| 4,729,371 A | 3/1988 | Krueger et al. | |
| 4,789,504 A | 12/1988 | Ohmori et al. | |
| 4,795,668 A | 1/1989 | Krueger et al. | |
| 4,798,850 A | 1/1989 | Brown | |
| 4,807,619 A | 2/1989 | Dyrud et al. | |
| 4,827,924 A | 5/1989 | Japuntich | |
| 4,850,347 A | 7/1989 | Skov | |
| 4,883,547 A | 11/1989 | Japuntich | |
| 5,025,052 A | 6/1991 | Crater et al. | |
| 5,057,710 A | 10/1991 | Nishiura et al. | |
| 5,062,421 A | 11/1991 | Burns et al. | |
| 5,099,026 A | 3/1992 | Crater et al. | |
| 5,237,986 A | 8/1993 | Seppala et al. | |
| 5,280,406 A | 1/1994 | Coufal et al. | |
| 5,307,796 A | 5/1994 | Kronzer et al. | |
| 5,325,892 A | 7/1994 | Japuntich et al. | |
| 5,346,691 A | 9/1994 | Raspanti | |
| 5,374,458 A | 12/1994 | Burgio | |
| 5,401,446 A | 3/1995 | Tsai et al. | |
| 5,411,576 A | 5/1995 | Jones et al. | |
| RE35,062 E | 10/1995 | Brostrom et al. | |
| 5,464,010 A | 11/1995 | Byram | |
| 5,472,481 A | 12/1995 | Jones et al. | |
| 5,496,507 A | 3/1996 | Angadjivand et al. | |
| 5,502,118 A * | 3/1996 | Macholdt et al. | 525/437 |
| 5,509,436 A | 4/1996 | Japuntich et al. | |
| 5,543,054 A * | 8/1996 | Charkoudian et al. | 210/638 |
| 5,558,089 A | 9/1996 | Castiglione | |
| 5,656,368 A * | 8/1997 | Braun et al. | 428/141 |
| 5,696,199 A | 12/1997 | Senkus et al. | |
| 5,763,078 A * | 6/1998 | Braun et al. | 428/175 |
| 5,780,153 A | 7/1998 | Chou et al. | |
| 5,804,295 A * | 9/1998 | Braun et al. | 428/323 |
| 5,908,598 A | 6/1999 | Rousseau et al. | |
| 5,919,847 A | 7/1999 | Rousseau et al. | |
| D412,573 S | 8/1999 | Castiglione | |
| 5,968,635 A | 10/1999 | Rousseau et al. | |
| 5,976,208 A | 11/1999 | Rousseau et al. | |
| 6,041,782 A | 3/2000 | Angadjivand et al. | |
| 6,068,799 A | 5/2000 | Rousseau et al. | |
| 6,072,027 A * | 6/2000 | Scortichini et al. | 528/422 |
| 6,074,869 A * | 6/2000 | Pall et al. | 435/286.5 |
| 6,095,143 A | 8/2000 | Dyrud et al. | |
| 6,119,691 A | 9/2000 | Angadjivand et al. | |
| 6,187,391 B1 * | 2/2001 | Kataoka et al. | 427/569 |
| 6,213,122 B1 | 4/2001 | Rousseau et al. | |
| 6,214,094 B1 | 4/2001 | Rousseau et al. | |
| 6,216,693 B1 | 4/2001 | Rekow et al. | |
| 6,238,466 B1 | 5/2001 | Rousseau et al. | |
| 6,268,495 B1 | 7/2001 | Rousseau et al. | |
| 6,280,824 B1 | 8/2001 | Insley et al. | |
| 6,302,103 B1 | 10/2001 | Resnick | |
| 6,332,465 B1 | 12/2001 | Xue et al. | |
| 6,371,116 B1 | 4/2002 | Resnick | |
| 6,375,886 B1 | 4/2002 | Angadjivand et al. | |
| 6,391,948 B1 * | 5/2002 | Clark et al. | 524/101 |
| 6,394,090 B1 | 5/2002 | Chen et al. | |
| 6,397,458 B1 | 6/2002 | Jones et al. | |
| 6,398,847 B1 | 6/2002 | Jones et al. | |
| 6,406,657 B1 | 6/2002 | Eitzman et al. | |
| 6,409,806 B1 | 6/2002 | Jones et al. | |
| 6,419,871 B1 | 7/2002 | Ogale | |
| 6,432,175 B1 | 8/2002 | Jones et al. | |
| 6,454,986 B1 | 9/2002 | Eitzman et al. | |
| 6,484,722 B2 | 11/2002 | Bostock et al. | |
| RE37,974 E | 2/2003 | Bowers | |
| 6,562,112 B2 | 5/2003 | Jones et al. | |
| 6,575,165 B1 | 6/2003 | Cook et al. | |
| D480,476 S | 10/2003 | Martinson et al. | |
| 6,660,210 B2 | 12/2003 | Jones et al. | |
| 6,666,209 B2 | 12/2003 | Bennett et al. | |
| 6,673,447 B2 * | 1/2004 | Wei et al. | 428/375 |
| 6,701,925 B1 | 3/2004 | Resnick | |
| 6,743,464 B1 | 6/2004 | Insley et al. | |
| 6,776,951 B2 | 8/2004 | Rousseau et al. | |
| 6,780,893 B2 * | 8/2004 | Sugaya et al. | 521/27 |
| 6,783,574 B1 | 8/2004 | Angadjivand et al. | |
| 6,808,551 B2 | 10/2004 | Jones et al. | |
| 6,824,718 B2 | 11/2004 | Eitzman et al. | |
| 6,843,248 B2 | 1/2005 | Japuntich et al. | |
| 6,854,463 B2 | 2/2005 | Japuntich et al. | |
| 6,872,645 B2 * | 3/2005 | Duan et al. | 438/584 |
| 6,969,484 B2 | 11/2005 | Horiguchi et al. | |
| 7,013,895 B2 | 3/2006 | Martin et al. | |
| 7,015,254 B2 * | 3/2006 | Holcomb | 516/82 |
| 7,026,014 B2 * | 4/2006 | Luzinov et al. | 427/402 |
| 7,028,689 B2 | 4/2006 | Martin et al. | |
| 7,117,868 B1 | 10/2006 | Japuntich et al. | |
| 7,132,496 B2 * | 11/2006 | Kerres et al. | 528/172 |
| 7,188,622 B2 | 3/2007 | Martin et al. | |
| 7,244,291 B2 | 7/2007 | Spartz et al. | |
| 7,244,292 B2 | 7/2007 | Kirk et al. | |
| 7,311,104 B2 | 12/2007 | Japuntich et al. | |
| 7,390,351 B2 * | 6/2008 | Leir et al. | 96/15 |
| 7,441,666 B2 * | 10/2008 | Kim et al. | 210/490 |
| 7,462,283 B2 * | 12/2008 | Kelly et al. | 210/500.38 |
| 2002/0174869 A1 | 11/2002 | Gahan et al. | |
| 2003/0134515 A1 | 7/2003 | David et al. | |
| 2005/0176325 A1 | 8/2005 | Tokuda et al. | |
| 2006/0093820 A1 * | 5/2006 | Margarit-Puri et al. | 428/365 |
| 2006/0254419 A1 | 11/2006 | Leonard | |
| 2007/0134337 A1 * | 6/2007 | Villanueva et al. | 424/489 |
| 2007/0141130 A1 * | 6/2007 | Villanueva et al. | 424/445 |
| 2007/0142262 A1 * | 6/2007 | Sayre et al. | 510/438 |
| 2007/0180997 A1 * | 8/2007 | Leir et al. | 96/69 |
| 2008/0207822 A1 * | 8/2008 | Yeager et al. | 524/543 |
| 2008/0249269 A1 * | 10/2008 | Chin et al. | 526/208 |

FOREIGN PATENT DOCUMENTS

| | | |
|---|---|---|
| JP | 11-319441 | 11/1999 |
| JP | 2002-115177 A | 4/2002 |
| JP | 2002-115178 | 4/2002 |
| JP | 2002-161467 | 6/2002 |
| JP | 2002-161471 | 6/2002 |

| | | |
|---|---|---|
| JP | 2002-173866 | 6/2002 |
| JP | 2002-212439 | 7/2002 |
| JP | 2002-249978 | 9/2002 |
| JP | 2002-339232 | 11/2002 |
| JP | 2003-13359 A | 1/2003 |
| JP | 2003-220310 A | 8/2003 |
| JP | 2004-060110 | 2/2004 |
| JP | 2004-66026 | 3/2004 |
| JP | 2004-66027 | 3/2004 |
| JP | 2004-195357 | 7/2004 |
| JP | 2005-131484 | 5/2005 |
| JP | 2005-131485 | 5/2005 |
| JP | 2006-037295 | 2/2006 |
| WO | WO 95/05501 | 2/1995 |
| WO | WO 97/07272 | 2/1997 |
| WO | WO 99/16532 | 4/1999 |
| WO | WO 00/13765 | 3/2000 |
| WO | WO 01/07144 A2 | 2/2001 |
| WO | WO 01/23351 A1 | 4/2001 |
| WO | WO 01/26778 A1 | 4/2001 |
| WO | WO 01/27371 A1 | 4/2001 |
| WO | WO 01/27381 A1 | 4/2001 |
| WO | WO 2008/016782 A1 | 2/2008 |

OTHER PUBLICATIONS

P. W. Chudleigh, *Charging of polymer foils using liquid contacts*, 21 Appl. Phys. Lett., pp. 547-548 (Dec. 1, 1972).

C.N. Davies, *The Separation of Airborne Dust and Particles*, Inst. Mech. Engn., London Proc. 1B, p. 185 (1952).

J. A. Dean, *Physicochemical Relationships*, Lange's Handbook of Chemistry, 15th Edition; McGraw-Hill: New York, pp. 9.1-9.8 (1999).

A.V. Delgado et al., *Measurement and Interpretation of Electrokinetic Phenomena* (IUPAC Technical Report), Pure Appl. Chem., vol. 77, No. 10, pp. 1753-1805 (2005).

R. E. Easton et al., *The MIDI! Basis Set for Quantum Mechanical Calculations of Molecular Geometries and Partial Charges*, 93 Theor. Chem. Acc., pp. 281-301 (1996).

F. Fairbrother et al., *Studies in Electro-endosmosis*, 125 J. Chem. Soc., pp. 2319-2330 (1924).

J.F. Gal et al., *Thermochemical Aspects of Proton Transfer in the Gas Phase*, 36 J. Mass Spectrom, pp. 699-716 (2001).

W.F. Harfst, *Back to Basics- Measuring pH in High Purity Water*, Ultrapure Water, Oct. 1994, pp. 75-76.

W. Kohn, *Nobel Lecture: Electronic Structure of Matter-Wave Functions and Density Functionals*, 71 Rev. Mod. Phys., pp. 1253-1266 (1999).

W. Kohn et al., *Self-Consistent Equations Including Exchange and Correlation Effects*, 140 Phys. Rev., p. A1133 (1965).

K.N. Kudin et al., *Why are Water-Hydrophobic Interfaces Charged?*, J. Am. Chem. Soc., published on Web Mar. 1, 2008, http://pubs.acs.org/cgi-bin/article.cgi/jacsat/2008/130/i12/pdf/ja077205t.pdf.

L.S. McCarty et al., *Ionic Electrets: Electrostatic Charging of Surfaces by Transferring Mobile Ions Upon Contact*, J. A. Chem. Soc. 2007, 129, pp. 4075-4088, published on Web Feb. 21, 2007, http://pubs.acs.org/cgi-bin/article.cgi/jacsat/2007/129/i13/pdf/ja067301e.pdf.

L.S. McCarty et al., *Electrostatic Charging Due to Separation of Ions at Interfaces: Contact Electrification of Ionic Electrets*, Angew. Chem. Int. Ed., 2008, 47, 2-22.

O.V. Shishkin et al., *Structural non-rigidity of six-membered aromatic rings*, 616 J. Mol. Struc., pp. 159-166 (2002).

P.J. Stephens et al., *Ab Initio Calculation of Vibrational Absorption and Circular Dichroism Spectra Using Density Functional Force Fields*, 98 J. Phys. Chem., pp. 11623-11627 (1994).

V.A. Wente, *Superfine Thermoplastic Fibers*, 48 Indust. Engn. Chem., pp. 1342-1346 (1956).

V.A. Wente et al., Report No. 4364 of the Naval Research Laboratories, published May 25, 1954, entitled *Manufacture of Super Fine Organic Fibers*.

V.A. Wente, Report No. 111437 of the Naval Research Laboratory, entitled *Manufacture of Superfine Organic Fibers* (Apr. 15, 1954).

Y. Zhao et al., *Design of Density Functionals That Are Broadly Accurate for Thermochemistry, Thermochemical Kinetics, and Nonbonded Interactions*, 109 J. Phys. Chem., pp. 5656-5667 (2005).

* cited by examiner

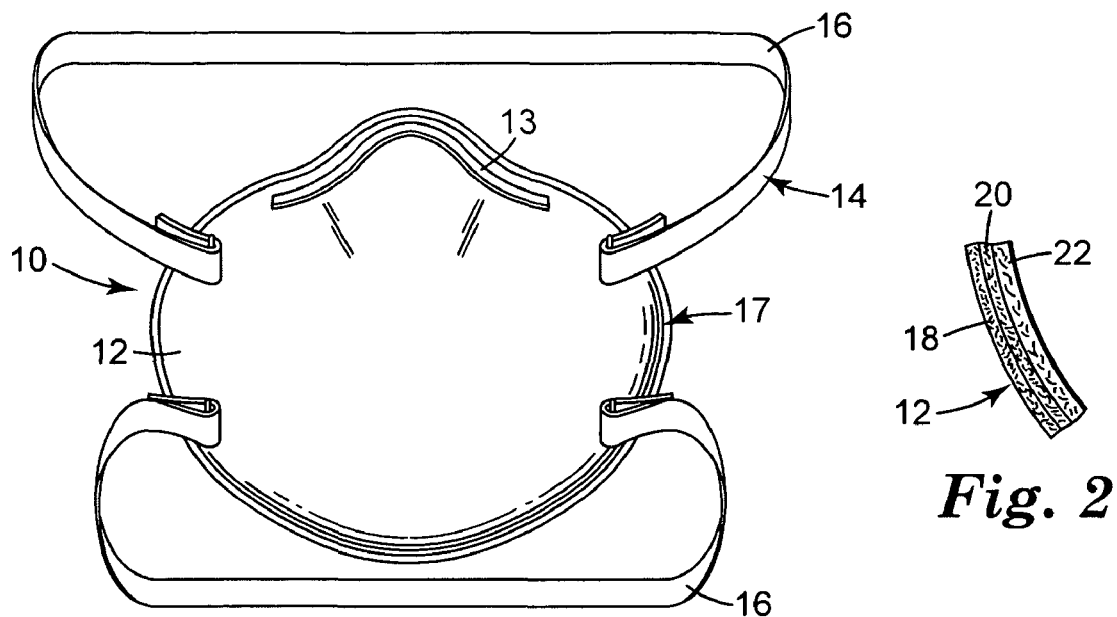
Fig. 1
Fig. 2
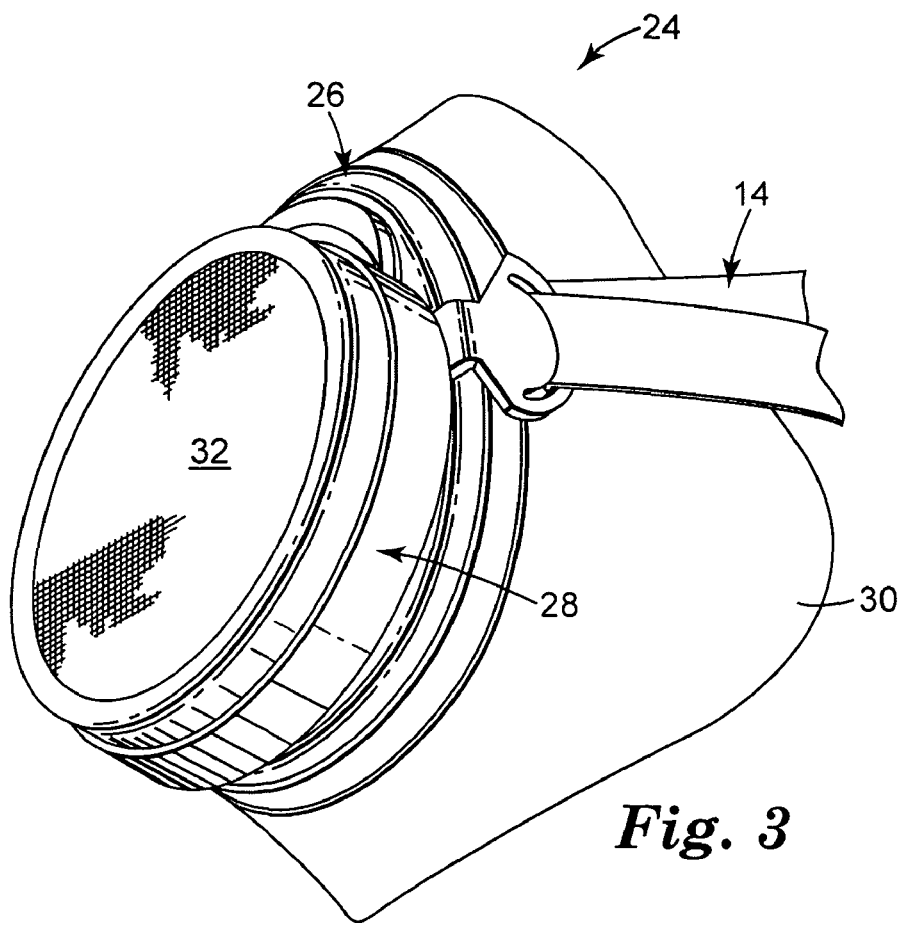
Fig. 3

METHOD OF MAKING ELECTRET ARTICLES BASED ON ZETA POTENTIAL

The present invention pertains to a new method of charging polymeric electret articles. The method involves using an aqueous liquid that has a conductivity and pH where both are selected as a function of the zeta potential of the article.

BACKGROUND

Electret articles—that is, dielectric articles that exhibit at least quasi-permanent electric charge—are known to exhibit good filtration properties. These articles have been fashioned in a variety of constructions, but for air filtration purposes, the articles commonly take the form of a nonwoven polymeric fibrous web. An example of such a product is the Filtrete™ brand furnace filter sold by the 3M Company. Nonwoven polymeric electret filters also have been used in personal respiratory protection devices—see, for example, U.S. Pat. No. 4,536,440 to Berg, U.S. Pat. No. 4,807,619 to Dyrud et al., U.S. Pat. No. 5,307,796 to Kronzer et al., U.S. Pat. No. 5,804,295 to Braun et al., and U.S. Pat. No. 6,216,693 to Rekow et al.

The electric charge enhances the ability of the nonwoven web to capture particles that are suspended in a fluid that passes through the web. The nonwoven web typically contains fibers that comprise dielectric—that is, nonconductive—polymers. A variety of techniques have been developed over the years for producing electret articles.

Early work relating to electrically-charging polymer foils is described by P. W. Chudleigh in *Mechanism of Charge Transfer to a Polymer Surface by a Conducting Liquid Contact*, 21 APPL. PHYS. LETT, 547-48 (Dec. 1, 1972), and in *Charging of Polymer Foils Using Liquid Contacts*, 47 J. APPL. PHYS., 4475-83 (October 1976). Chudleigh's method involves charging a polyfluoroethylene polymer foil by applying a voltage to the foil. The voltage is applied through a conducting liquid that contacts the foil surface.

An early-known technique for making a polymeric electret in fibrous form is disclosed in U.S. Pat. No. 4,215,682 to Kubic and Davis. In this method, the fibers are bombarded with electrically-charged particles as they issue from a die orifice. The fibers are created using a "melt-blowing" process, where a stream of gas, which is blown at high velocity next to the die orifice, draws out the extruded polymeric material and cools it into a solidified fiber. The bombarded melt-blown fibers accumulate randomly on a collector to create the fibrous electret web. The patent mentions that filtering efficiency can be improved by a factor of two or more when the melt-blown fibers are electrically-charged in this fashion.

Fibrous electret webs also have been produced by corona charging. U.S. Pat. No. 4,588,537 to Klaase et al., for example, shows a fibrous web that is continuously fed into a corona discharge device while positioned adjacent to one major surface of a substantially-closed dielectric foil. The corona is produced from a high-voltage source that is connected to oppositely-charged thin tungsten wires. Another high-voltage technique for imparting an electrostatic charge to a nonwoven web is described in U.S. Pat. No. 4,592,815 to Nakao. In this charging process, the web is brought into tight contact with a smooth-surfaced ground electrode.

Fibrous electret webs also may be produced from polymer films or foils, as described in U.S. Pat. Re. 30,782, Re. 31,285, and Re. 32,171 to van Turnhout. The polymer films or foils are electrostatically charged before being fibrillated into fibers that are subsequently collected and processed into a nonwoven fibrous filter.

Mechanical approaches too have been used to impart an electric charge to fibers. U.S. Pat. No. 4,798,850 to Brown describes a filter material that contains a mixture of two different crimped synthetic polymer fibers that have been carded into a fleece and then needled to form a felt. The patent describes mixing the fibers well so that they become electrically-charged during the carding. The process disclosed in Brown is commonly referred to as "tribocharging".

Tribocharging also can occur when high-velocity uncharged jets of gases or liquids are passed over the surface of a dielectric film. In U.S. Pat. No. 5,280,406, Coufal et al. disclose that when jets of an uncharged fluid strike the surface of the dielectric film, the surface becomes charged.

A more recent development uses water to impart electric charge to a nonwoven fibrous web (see U.S. Pat. No. 5,496,507 to Angadjivand et al.). Pressurized jets of water or a stream of water droplets are impinged onto a nonwoven web that contains nonconductive microfibers to create the electric charge. Subjecting the web to an air corona discharge treatment before the hydrocharging operation can further enhance charging. The resulting charge provides filtration-enhancing properties. See also U.S. Pat. Nos. 6,824,718 and 6,406,657 to Eitzman et al., and U.S. Pat. Nos. 6,783,574, 6,375,886, and 6,119,691 to Angadjivand et al., and U.S. Pat. No. 6,743,464 to Insley et al., for other methods of using water to produce electret articles. Nonaqueous polar liquids too have been used in making fibrous electret articles—see U.S. Pat. No. 6,454,986 to Eitzman et al.

Adding certain additives to the web has improved electret performance. One method for improving resistance to oily-mist aerosols, includes adding a melt processable fluorochemical additive such as a fluorochemical oxazolidinone, a fluorochemical piperazine, or a perfluorinated alkane to the polymer during the creation of the polymeric fibrous article—see, for example, U.S. Pat. Nos. 5,025,052 and 5,099,026 to Crater et al. and U.S. Pat. Nos. 5,411,576 and 5,472,481 to Jones et al. The fluorochemicals are melt processable, that is they suffer substantially no degradation under the melt processing conditions that are used to form the fibers in the electret web—see also U.S. Pat. No. 5,908,598 to Rousseau et al. In addition to a melt-processing method, fluorinated electrets also have been made by placing a polymeric article in an atmosphere that contains a fluorine-containing species and an inert gas and then applying an electrical discharge to modify the surface chemistry of the polymeric article. The electrical discharge may be in the form of a plasma such as an AC corona discharge. The plasma fluorination process causes fluorine atoms to become present on the surface of the polymeric article. The fluorinated polymeric article may be electrically charged using, for example, the hydrocharging techniques mentioned above. The plasma fluorination process is described in a number of U.S. Pat. Nos. 6,397,458, 6,398,847, 6,409,806, 6,432,175, 6,562,112, 6,660,210, and 6,808,551 to Jones/Lyons et al. Electret articles that have a high fluoro-saturation ratio are described in U.S. Pat. No. 7,244,291 to Spartz et al., and electret articles that have a low fluorosaturation ratio, in conjunction with heteroatoms, is described in U.S. Pat. No. 7,244,292 to Kirk et al. Other publications that disclose fluorination techniques include: U.S. Pat. Nos. 6,419,871, 6,238,466, 6,214,094, 6,213,122, 5,908,598, 4,557,945, 4,508,781, and 4,264,750; U.S. Publications US 2003/0134515 A1 and US 2002/0174869 A1; and International Publication WO 01/07144.

Filter webs also have been produced without deliberately post-charging or "electreting" the fibers or the fiber webs—see U.S. Pat. No. 5,780,153 to Chou et al. The fibers are made from a copolymer that comprises: a copolymer of ethylene, 5 to 25 weight percent of (meth)acrylic acid, and optionally, though less preferably, up to 40 weight percent of an alkyl (meth)acrylate whose alkyl groups have from 1 to 8 carbon atoms. Five to 70% of the acid groups are neutralized with a metal ion, particularly an ion of zinc, sodium, lithium, or magnesium, or a mixture of these. The copolymer has a melt index of 5 to 1000 grams (g) per 10 minutes. The remainder may be a polyolefin such as polypropylene or polyethylene. The fibers may be produced through a melt-blowing process and may be cooled quickly with water to prevent excess bonding. The patent discloses that the fibers have high static retention of any existing or deliberate, specifically induced, static charge.

Other electrets that contain additives are described in U.S. Pat. No. 5,057,710 to Nishiura. The polypropylene electrets disclosed in Nishiura contain at least one stabilizer selected from hindered amines, nitrogen-containing hindered phenols, and metal-containing hindered phenols. The patent mentions that an electret that contains these additives can offer high heat-stability. The electret treatment was carried out by placing the nonwoven fabric sheet between a needle-like electrode and an earth electrode. U.S. Pat. Nos. 4,652,282 and 4,789,504 to Ohmori et al. describe incorporating a fatty acid metal salt in an insulating polymer to maintain high dust-removing performance over a long period of time. Japanese Patent Kokoku JP60-947 describes electrets that comprise poly 4-methyl-1-pentene and at least one compound selected from (a) a compound containing a phenol hydroxy group, (b) a higher aliphatic carboxylic acid and its metal salts, (c) a thiocarboxylate compound, (d) a phosphorous compound, and (e) an ester compound. The patent indicates that the electrets have long-term storage stability.

Other Japanese publications that disclose methods for producing electret articles include 2002-115178, 2002-115177A, 2003-013359, 2004-66026, 2004-66027, and 2004-195357.

For a brief survey of the ion chemistry at the interfaces and of how ions may be transferred, facilitated by adsorbed water to produce electrets, see McCarty and Whitesides, *Electrostatic Charging Due to Separation of Ions at Interfaces: Contact Electrification of Ion Electrets,* 47 ANGW. CHEM. INT. 2-22 (2008); see also McCarty et al., *Ionic Electrets: Electrostatic Charging of Surfaces by Transferring Mobile Ions Upon Contact,* 129 J. AM. CHEM. SOC. 4075-88 (2007), and Kudin et al., *Why Are Water—Hydrophobic Intersurfaces Interfaces Charged?,* J. AM. CHEM. SOC. (received Sep. 17, 2007).

GLOSSARY

In this document:

"aqueous" means that the aqueous liquid contains at least about 40% water by volume;

"comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is a semi open-ended term in that it excludes only those things or elements that would have a deleterious effect on the performance of the electret article in serving its intended function;

"conductivity" means a substances ability to transmit electricity;

"electric charge" means that there is charge separation;

"enthalpy" means a thermodynamic property of a substance, represented by "H" where H=U+pV where U is the internal energy, p is the pressure, and V is the volume; enthalpy, H, is the internal energy of a system plus the product of pressure and volume; it is a change in a system that is equal to the heat brought to the system at constant pressure;

"enthalpy of deprotonation" means the enthalpy ($\Delta H_{dp}$) required to remove a proton from a molecule;

"fibrous" means possessing fibers and possibly other ingredients;

"fibrous electret web" means a web that contains fibers and that exhibits a quasi-permanent electric charge;

"liquid" means the state of matter between a solid and a gas;

"nonconductive" means possessing a volume resistivity of about $10^{14}$ ohm·cm or greater at room temperature (22° C.);

"nonwoven" means a structure or portion of a structure where the constitutents (e.g. fibers) are held together by a means other than weaving;

"N-substituted amino aromatic" means an aromatic group that has one to three fused rings, e.g. benzene, naphthalene, or triazine, and that is substituted with at least one substituted amino group of the type —$NR^1R^2$ where the group $R^1$ is hydrogen, alkyl having 1 to 20 carbons, an aryl having 1 to 5 rings that may be connected or fused, a heteroalkyl having 1 to 20 carbon atoms or a substituted alkyl having 1 to 20 carbon atoms, and the group $R^2$ is hydrogen, alkyl having 1 to 20 carbons, an aryl having 1 to 5 rings that may be connected or fused, a heteroalkyl having 1 to 20 carbons, or a substituted alkyl having 1 to 20 carbon atoms.

"pH" means a measure of the acidity or alkalinity (basicity) of a solution at room temperature and pressure (22° C., 101,300 Pascals), on a logarithmic scale of 0 to 14, with neutrality being represented by a value of 7, with increasing acidity represented by decreasingly smaller values, and with increasing alkalinity represented by increasingly larger values, defined formally as the negative logarithm to the base 10 of the conventional hydrogen ion activity;

"polymer" means an organic material that contains repeating linked molecular units or groups, regularly or irregularly arranged;

"polymeric" means containing a polymer and optionally other ingredients;

"polymeric fiber-forming material" means a composition that contains a polymer, or that contains monomers capable of producing a polymer, and possibly contains other ingredients, and that is capable of being formed into solid fibers;

"proton affinity" or "PA" means the negative of the enthalpy change when a proton is attached to a molecule in kilocalories per mole (kcal/mol);

"quality factor" means the quality factor QF determined in accordance with the Quality Factor Test set forth below;

"quasi-permanent" means that the electric charge resides in the article under standard atmospheric conditions (22° C., 101,300 Pascals atmospheric pressure, and 50% humidity) for a time period long enough to be significantly measurable;

"water" means $H_2O$; and

"zeta potential" means the electrical potential difference (a.k.a. electrokinetic potential) at zero electric current, caused by the flow of liquid under a pressure gradient.

SUMMARY OF THE INVENTION

The present invention pertains to a new method of making an electret article. The method comprises: (a) providing a polymeric article to be charged; and (b) contacting the polymeric article to be charged with an aqueous liquid that has a pH and conductivity as follows: (i) if the article has a zeta potential of less than −7.5 millivolts (mV), then the contacting water has a conductivity of about 5 to 9,000 microSiemens per centimeter (microS/cm) and a pH greater than 7; and (ii) if the article has a zeta potential of greater than −7.5 mV, then the contacting water has a conductivity of about 5 to 5,500 microSiemens per centimeter (microS/cm) and a pH of 7 or less. The article may be dried actively (with a vacuum or heat) or passively (hang drying) or combinations thereof.

The inventive method provides a new recipe for making an electret, which if followed, enables improved filtration performance to be achieved for electret articles adapted for such purposes. The inventors discovered that improvements in filtration, as measured by the known parameter quality factor (QF), can be achieved when charging the article with an aqueous liquid that is selected to have a conductivity and pH as a function of the zeta potential. The inventors further discovered that the proton affinity (PA) and enthalpy of deprotonation ($\Delta H_{dp}$) also play a roll when certain additives are used in the polymeric material that comprises the electret article. Improved filtration performance is beneficial in that it can allow less filter media to be used to achieve the same degree of filtration. An enhanced charge level or a more optimum charge distribution in the resulting electret article may be responsible for the enhanced performance.

BRIEF DESCRIPTION OF THE DRAWINGS

FIG. 1 is a front perspective view of a disposable respiratory mask 10 that may use electret filter media of the present invention.

FIG. 2 is a cross-section of the mask body 12 illustrated in FIG. 1, showing a fibrous electret filter layer 20.

FIG. 3 is a perspective view of a respiratory mask 24 that has a filter cartridge 28 that may include electret filter media of the present invention.

DETAILED DESCRIPTION OF PREFERRED EMBODIMENTS

Figure 4:
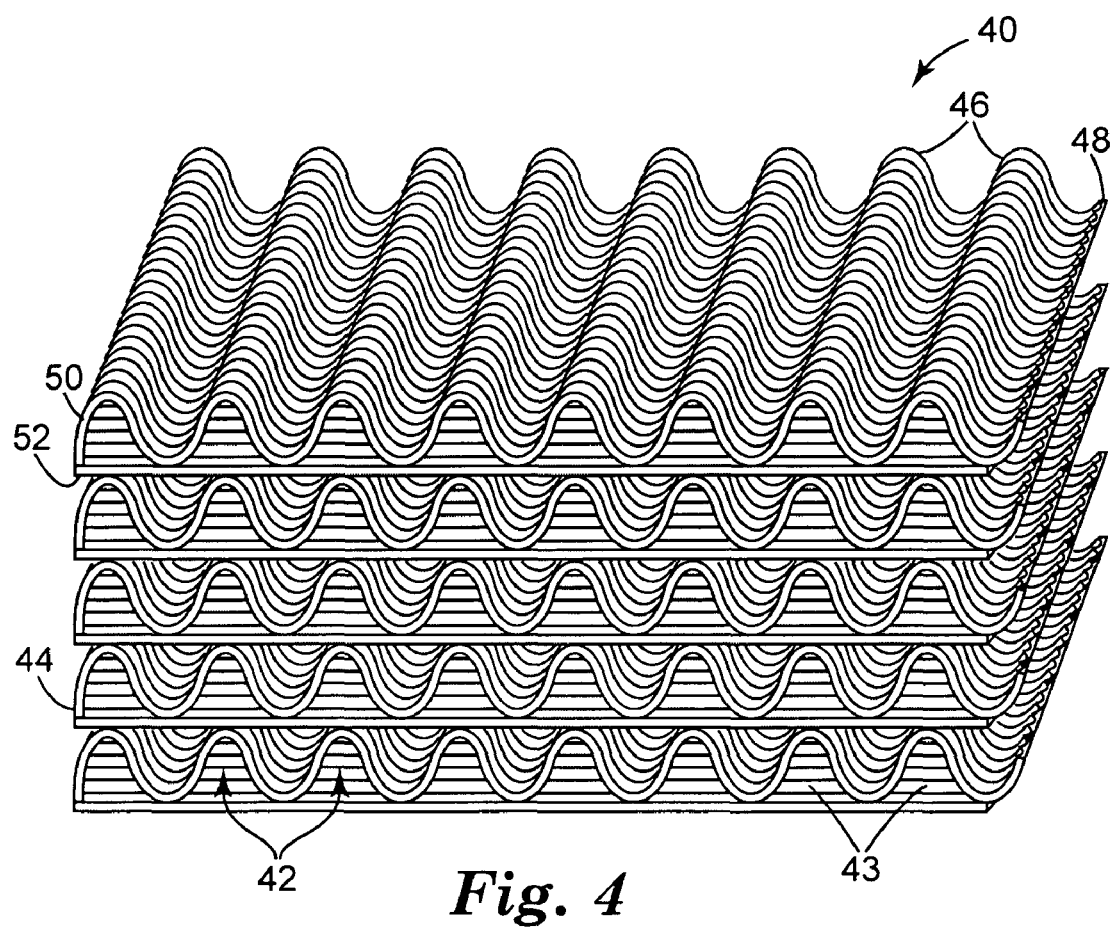
FIG. 4 is an illustration of a non-fibrous electret article 40 that may be used in connection with the present invention.

In describing preferred embodiments of the invention, specific terminology is used for the sake of clarity. The invention, however, is not intended to be limited to the specific terms so selected, and it is to be understood that each term so selected includes all technical equivalents that operate similarly.

In practicing the present invention, electret articles may be made by first providing the article to be charged and then contacting that article with an aqueous liquid that has a conductivity and pH that vary based on the zeta potential of the article-to-be-charged. If the article-to-be-charged has a zeta potential of greater than −7.5 millivolts, then the contacting aqueous liquid will have a conductivity of 5 to 5,500 microSiemens/cm and a pH of 7 or less. And if the zeta potential is less than or equal to −7.5 millivolts, then the aqueous liquid will have a conductivity of 5 to 9,000 microSiemens/cm and a pH greater than 7. If the polymeric article contains an N-substituted amino aromatic additive that has a proton affinity greater than about 230 kilocalories per mole (kcal/mol) and an enthalpy of deprotonation of greater than about 335 kcal/mol and a proton affinity less than about 230 kcal/mol, then the aqueous liquid will have a pH of 7 or less and a conductivity of 5 to 5,500 microS/cm And if the polymeric article contains an N-substituted amino aromatic additive that has an enthalpy of deprotonation of less than about 335 kcal/mol, then the aqueous liquid will have a pH of greater than 7 and a conductivity of 5 to 9,000 microS/cm. The desired pH value and conductivity of the aqueous liquid can be modified to impart charge according to the invention by controlling the type and concentration of various chemical species in the water. For example, both the pH and conductivity of a sodium hydroxide (NaOH) aqueous solution may be gradually increased by adding more sodium hydroxide into the water. The pH value of an acetic acid ($CH_3COOH$) aqueous solution may gradually decrease, and its conductivity gradually increase with the addition of acetic acid into the water. The pH of the aqueous liquid can be kept constant while the conductivity can be adjusted by adding a constant quantity of sodium hydroxide (NaOH) for pH control and varying the amount of neutral sodium chloride (NaCl) for conductivity control. In a continuous process, pH and conductivity may be measured continuously for extended time periods, particularly at the onset of new aqueous liquid supplies.

Applicant's method of making electret articles enables good performing electret articles to be prepared, which performance may be particularly beneficial for articles that are used in filtering applications. Electret articles that are made in connection with the present invention may take a variety of shapes and configurations. The articles may be solid, porous, fibrous, etc.

Fibrous articles suitable for use in this invention can be made from a variety of techniques, including air laid processes, wet laid processes, hydro-entanglement, spun-bond processes, and melt blown processes such as described in Van A. Wente, *Superfine Thermoplastic Fibers*, 48 INDUS. ENGN. CHEM. 1342-46 and in Report No. 4364 of the Naval Research Laboratories, published May 25, 1954, entitled *Manufacture of Super Fine Organic Fibers* by Van A. Wente et al. The fibrous articles may be in web form, made using combinations of these techniques and combinations of such fibers. Microfibers, particularly meltblown microfibers, are particularly suitable for use in fibrous webs that are used as filters. As used in this document, "microfiber" means fiber(s) that have an effective diameter of about 25 micrometers or less. Effective fiber diameter can be calculated using equation number 12 in Davies, C. N., *The Separation of Airborne Dust and Particles*, INST. MECH. ENGN., LONDON PROC. 1B (1952). For filtering applications, the microfibers typically have an effective fiber diameter of less than 20 micrometers, more typically, about 1 to about 10 micrometers. Fibers made from fibrillated films may also be used—see, for example, U.S. Pat. RE30,782, RE32,171, 3,998,916 and U.S. Pat. No. 4,178,157 to Van Turnout. Nonwoven webs that are made by the process of the present invention may exhibit quality factors that exceed 1.0, 1.2, 1.5, 1.6, 1.7, 1.8, 2.0, 2.3, 2.4, and 3.4. Typically a nonwoven electret web prepared according to the invention will exhibit a Quality Factor greater than 15%, more typically greater than 50% over the same article not made according to the inventive method.

Staple fibers also may be combined with the microfibers to improve web loft, that is, to reduce its density. Reducing web density can lower the pressure drop across the web, making it easier for air to pass through the filter. Lower pressure drops are particularly desirable in personal respiratory protection devices because they make the respirator more comfortable to wear. When the pressure drop is lower, less energy is needed to draw air through the filter. A respirator wearer who dons a negative pressure mask—that is a respirator that requires negative pressure from the wearer's lungs to draw air through the filter—thus does not have to work as hard to breathe filtered air. Lower energy requirements also can be beneficial in powered filtering systems to reduce costs associated with powering the fan and to extend the service life of a battery in a battery powered system. In a typical nonwoven fibrous filter, no more than about 90 weight percent staple fibers are present, more typically no more than about 70 weight percent. Often, the remainder of the fibers are microfibers. Examples of webs that contain staple fibers are disclosed in U.S. Pat. No. 4,118,531 to Hauser.

Active particulate also may be included in electret webs for various purposes, including sorbent purposes, catalytic purposes, and others. U.S. Pat. No. 5,696,199 to Senkus et al., for example, describes various types of active particulate that may be suitable. Active particulate that has sorptive properties—such as activated carbon or alumina—may be included in the web to remove organic vapors during filtration operations. The active particulate may be present in the web at amounts up to about 95 volume percent. Examples of particle-loaded nonwoven webs are described, for example, in U.S. Pat. No. 3,971,373 to Braun, U.S. Pat. No. 4,100,324 to Anderson, and U.S. Pat. No. 4,429,001 to Kolpin et al.

Polymers that may be suitable for use in producing electret articles include thermoplastic organic nonconductive polymers. These polymers are generally capable of retaining a high quantity of trapped charge and are capable of being processed into fibers, such as through a melt-blowing apparatus or a spun-bonding apparatus. The term "organic" means that the backbone of the polymer comprises carbon atoms. Preferred polymers include polyolefins, such as polypropylene, poly-4-methyl-1-pentene, blends or copolymers containing one or more of these polymers, and combinations of these polymers. Other polymers may include polyethylene, other polyolefins, perfluoropolymers, polyvinylchlorides, polystyrenes, polycarbonates, polyethylene terephthalate, other polyesters, such as polylactide, and combinations of these polymers and optionally other nonconductive polymers may be used as polymeric fiber-forming material or for producing other electret articles.

The polymeric articles used to produce electret articles in connection with the present invention also may be extruded or otherwise formed to have multiple polymer components—see U.S. Pat. No. 4,729,371 to Krueger and Dyrud and U.S. Pat. Nos. 4,795,668, and 4,547,420 to Krueger and Meyer. The different polymer components may be arranged concentrically or longitudinally along the length of the fiber to create, for example, a bicomponent fiber. The fibers may be arranged to form a "macroscopically homogeneous" web, namely, a web that is made from fibers that each have the same general composition.

Fibers made from polymeric materials also may contain other suitable additives. Possible additives include thermally stable organic triazine compounds or oligomers, which compounds or oligomers contain at least one nitrogen atom in addition to those in the triazine ring—see U.S. Pat. Nos. 6,268,495, 5,976,208, 5,968,635, 5,919,847, and 5,908,598 to Rousseau et al. Another additive known to enhance electrets charged by jets of water is Chimassorb™ 944 LF (poly [[6-(1,1,3,3-tetramethylbutyl)amino]-s-triazine-2,4-diyl] [[(2,2,6,6-tetramethyl-4-piperidyl)imino]hexamethylene[(2, 2,6,6-tetramethyl-4-piperidyl)imino]]), available from Ciba Specialty Chemicals, Inc. The additives may be N-substituted amino aromatic compounds, particularly tri-amino substituted compounds that are, for example, of the formulas (1) or (2) set forth below:

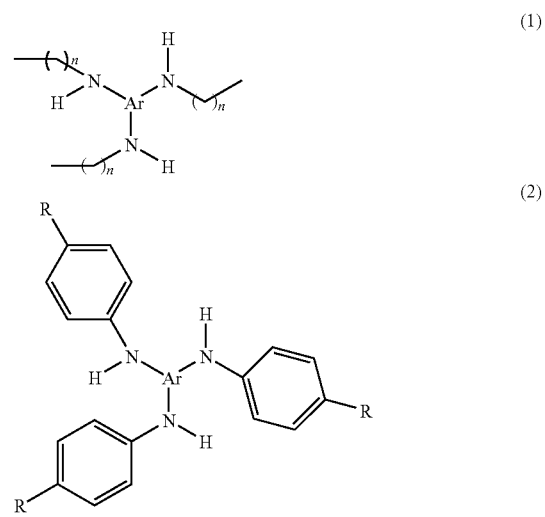

where Ar is a trivalent aromatic group substituted by zero to 3 nitrogen atoms, n is an integer of 1 to 20, and each R independently may be a group that has less than about 20 non-hydrogen non-metal atoms. Each R, for example, may independently be: hydrogen; halogen, for example, fluorine; hydroxyl; alkyl having up to 20 carbon atoms, for example methyl, ethyl, propyl, butyl, etc; halogen substituted alkyls such as trifluoromethyl; alkoxy having 1 to 20 carbon atoms such as methoxy; ester having 2 to 20 carbon atoms such as methoxycarbonyl; substituted amines that contain 2 to 20 carbon atoms such as methylamino; and nitro. Charge additives that meet these formulas are set forth below in the Example section. Further examples of charge-enhancing additives are provided in U.S. Patent Application Ser. No. 61/058,029, entitled Charge-Enhancing Additives For Electrets filed on the same day as this patent application and U.S. Patent Application Ser. No. 61/058,041, entitled Electret Webs With Charging-Enhancing Additives. Typically, the additives are present in the polymeric article at about 0.1 to 5% by weight, more typically at about 0.25 to 2% by weight.

Other additives include light stabilizers, primary and secondary antioxidants, metal deactivators, hindered amines, hindered phenols, fatty acid metal salts, triester phosphites, phosphoric acid salts, fluorine-containing compounds, melamines, and the additives mentioned in U.S. Provisional Patent Application Ser. No. 60/992,745, U.S. Publication No. 2007/0180997 to Leir et al., U.S. Pat. No. 5,057,710 to Nishiura et al., Japanese Publication No. 2002212439, Japanese Publication No. 2005131485.

Fibers that contain additives can be quenched after shaping a heated molten blend of the polymer and additive—followed by annealing and charging steps—to create an electret article. Enhanced filtration performance may be imparted to the article by making the electret in this manner—see U.S. Pat. No. 6,068,799 to Rousseau et al. The electret articles also can be made to have a low level of extractable hydrocarbon (<3.0 weight %) to improve loading performance—see U.S. Pat. No. 6,776,951 to Rousseau et al.

The polymeric material that is used to produce an electret article according to the method of the invention may have a volume resistivity of $10^{14}$ ohm·cm or greater at room temperature. The volume resistivity may also be about $10^{16}$ ohm·cm or greater. Resistivity of the polymeric fiber-forming material can be measured according to standardized test ASTM D 257-93. The polymeric fiber-forming material used to make electret articles such as the melt blown fibers also should be substantially free from components such as antistatic agents, which agents could increase the electrical conductivity or otherwise interfere with the ability of the electret article to accept and hold electrostatic charges.

Electrets that comprise nonwoven polymeric fibrous webs for respiratory filters typically have a "basis weight" of about 2 to 500 grams per square meter ($g/m^2$), more typically about 20 to 150 $g/m^2$. The basis weight is the mass per unit area of filter web. The thickness of such nonwoven polymeric fibrous web is typically about 0.25 to 20 millimeters (mm), more preferably about 0.5 to 2 mm. Multiple layers of fibrous electret webs are commonly used in filter elements. The solidity of the fibrous electret web typically is about 1 to 25%, more typically about 3 to 10%. Solidity is a unitless parameter that defines the solids fraction in the article. The inventive article can contain a generally uniform charge distribution throughout a charged nonwoven fibrous web, without substantial regard to basis weight, thickness, or solidity.

The inventive electret articles may be used as filters in filtering masks that are adapted to cover at least the nose and mouth of a wearer.

FIG. 1 illustrates an example of a filtering face mask 10 that may be constructed to contain an electrically-charged nonwoven web that is produced according to the present invention. The generally cup-shaped body portion 12 may be molded into a shape that fits over the nose and mouth of the wearer. The body portion 12 is porous so that inhaled air can pass through it. The electret filter medium is disposed in the mask body 12 (typically over substantially the whole surface area) to remove contaminants from the inhaled air. A conformable nose clip 13 may be placed on the mask body to assist in maintaining a snug fit over the wearer's nose. The nose clip can be an "M-shaped" clip as described in U.S. Pat. Des. 412,573 and U.S. Pat. No. 5,558,089 to Castiglione. A strap or harness system 14 may be provided to support the mask body 12 on the wearer's face. Although a dual strap system is illustrated in FIG. 1, the harness 14 may employ only one strap 16, and it may come in a variety of other configurations—see, for example, U.S. Pat. No. 4,827,924 to Japuntich et al., U.S. Pat. No. 5,237,986 to Seppalla et al., U.S. Pat. No. 5,464,010 to Byram, U.S. Pat. No. 6,095,143 to Dyrud et al., and U.S. Pat. No. 6,332,465 to Xue et al. An exhalation valve can be mounted to the mask body to rapidly purge exhaled air from the mask interior—see U.S. Pat. Nos. 5,325,892, 5,509,436, 6,843,248, 6,854,463, 7,117,868, and 7,311,104 to Japuntich et al.; U.S. Pat. RE37,974 to Bowers; and U.S. Pat. Nos. 7,013,895, 7,028,689, and 7,188,622 to Martin et al.

FIG. 2 illustrates an example of a cross-section of a mask body 12. Mask body 12 may have a plurality of layers, as indicated by numerals 18, 20, and 22. The electret filter media may be supported by other layers, such as shaping layers that are made from thermally bonded fibers, such as bicomponent fibers that have an outer thermoplastic component that enables the fibers to bond to other fibers at points of fiber intersection. Layer 18 can be an outer shaping layer, layer 20 may be a filtration layer, and layer 22 may be an inner shaping layer. Shaping layers 18 and 22 support filtration layer 20 and provide shape to mask body 12. Although the term "shaping layers" is used in this description, shaping layers also have other functions, which in the case of an outermost layer may even be a primary function, such as protection of the filtration layer and prefiltration of a gaseous stream. Also, although the term "layer" is used, one layer may in fact comprise several sublayers, assembled to obtain desired thickness or weight. In some embodiments only one, generally inner, shaping layer is included in a face mask, but shaping may be accomplished more durably and conveniently if two shaping layers are used, for example, one on each side of the filtration layer as shown in FIG. 2. Shaping layer examples are described in the following patents: U.S. Pat. No. 4,536,440 to Berg, U.S. Pat. No. 4,807,619 to Dyrud et al., U.S. Pat. No. 5,307,796 to Kronzer et al., U.S. Pat. No. 5,374,458 to Burgio, and U.S. Pat. No. 4,850,347 to Skov. Although the illustrated mask body shown in FIGS. 1 and 2 has a generally round, cup-shaped configuration, the mask body may have other shapes—see for example U.S. Pat. No. 4,883,547 to Japuntich. Further, the mask body may comprise an inner and/or outer cover web to provide a smooth and comfortable contact with the wearer's face and/or to preclude fibers from the shaping and filtration layers from coming loose from the mask body—see U.S. Pat. No. 6,041,782 to Angadjivand et al. The respiratory mask also may have a flat-folded mask body (rather than a molded mask body)—see, for example, U.S. Pat. No. 6,394,090 to Chen and U.S. Pat. No. 6,484,722 to Bostock et al.

FIG. 3 illustrates another respirator 24 that may use the inventive electret articles as a filter. Respirator 24 includes an elastomeric mask body 26 that has a filter cartridge 28 secured to it. Mask body 26 typically includes an elastomeric face piece 30 that conformably fits over the nose and mouth of a person. The filter cartridge 28 may contain the electret filter media made according to the present invention to capture contaminants before they are inhaled by the wearer. The filter element may include the polymeric electret filter article by itself or in conjunction with a gaseous filter such as an activated carbon bed. A porous cover or screen 32 may be provided on the filter cartridge to protect the external surface of the filter element. Examples of other filter cartridges where the inventive electret filter media may be used are disclosed, for example, in a filter cartridge for a respirator, such as the filter cartridge disclosed in U.S. Pat. No. Re. 35,062 to Brostrom et al. or in U.S. Pat. No. 5,062,421 to Burns and Reischel. As shown in these patents, multiple filter cartridges may be used. The cartridges also may be removable and replaceable. In addition, the inventive filter media may be used in the filter cartridges of powered air purifying respirators (PAPRs). Examples of PAPRs are shown in U.S. Pat. No. 6,666,209 to Bennett et al. and U.S. Pat. No. 6,575,165 to Cook et al. Further, the inventive filter media can be used in filter cartridges for escape hoods—see U.S. Pat. D480,476 to Martinson et al., and U.S. Pat. Nos. 6,302,103, 6,371,116, 6,701,925 to Resnick.

FIG. 4 shows a perspective view of a filtration media array 40. The structure of array 40 may comprise multiple flow channels 42 that have inlets 43 on a first side 44 of the array 40 and have outlets 46 on a second side of the array 48. The flow channels may be defined by a corrugated or microstructured layer 50 and a cap layer 52. The contoured layer 50 may be joined to the cap layer 52 at one or more peaks or valleys. By stacking multiple layers of structured and planar members, a microchanneled arrangement may be achieved. The flow channels tend to have a high aspect ratio, and the film layers are preferably electrically charged to provide the article 40 with good capture efficiency. The pressure drop across the array 40 from first side 44 to second side 48 is negligible.

Non-fibrous electret articles that are used for filtration purposes thus may take the form of a shaped film, a microstructured surface, or a multitude of microstructured channels. Examples of non-fibrous electret articles are disclosed in U.S. Pat. No. 6,752,889 to Insley et al., U.S. Pat. No. 6,280,824 to Insley et al., U.S. Pat. No. 4,016,375 to Van Turnout, and U.S. Pat. No. 2,204,705 to Rutherford.

The electret charge can be imparted to the polymeric articles using various known (or later developed) apparatus. Documents that describe known hydrocharging apparatus include U.S. Pat. Nos. 5,496,507, 6119,691, 6,375,886, and 6,783,574 to Angadjivand et al., U.S. Pat. No. 6,406,657 to Eitzman et al., and U.S. Pat. No. 6,743,464 to Insley et al.

The article that is to be charged in connection with the present invention is contacted with an aqueous liquid that has a pH and conductivity that vary depending on the zeta potential of the article. The zeta potential of the article may be measured using the Zeta Potential Test set forth below. The water conductivity and pH can be measured using the Conductivity Measurement and pH Measurement also set forth below.

Hydrocharging methods deposit both positive and negative charge onto the fibers such that the positive and negative charge is randomly dispersed throughout the web. Random charge dispersal tends to produce an unpolarized web. Thus, a nonwoven fibrous electret web produced by charging with a polar liquid like water may be substantially unpolarized in a plane normal to the plane of the web. Fibers that have been charged in this manner ideally exhibit the charge configuration shown in FIG. 5C of U.S. Pat. No. 6,119,691 to Angadjivand et al. If the fibrous web also is subjected to a corona treatment operation, it would exhibit a charge configuration similar to the configuration shown in FIG. 5B of that patent. A web, formed from fibers charged solely using hydrocharging, typically has unpolarized trapped charge throughout the volume of the web. "Substantially unpolarized trapped charge" refers to a fibrous electret web that exhibits less than 1 $\mu C/m^2$ of detectable discharge current using thermally-simulated discharge current (TSDC) analysis, where the denominator is the electrode surface area. This charge configuration can be shown by subjecting the web to TSDC. One example of a useful hydrocharging process includes impinging jets of water or a stream of water droplets onto the article at a pressure and for a period sufficient to impart a filtration enhancing electret charge to the web, and then drying the article—see U.S. Pat. No. 5,496,507 to Angadjivand et al. The pressure necessary to optimize the filtration enhancing electret charge imparted to the article will vary depending on the type of sprayer used, the type of polymer from which the article is formed, the type and concentration of additives to the polymer, and the thickness and density of the article. Pressures in the range of about 10 to about 500 psi (69 to 3450 kPa) are suitable. The jets of water or stream of water droplets can be provided by any suitable spray device. One example of a useful spray device is the apparatus used for hydraulically entangling fibers.

Corona pretreatment or post-treatment also may be used in conjunction with the hydrocharging apparatus described above—see U.S. Pats. RE 30,782; 31,285 and 32,171 to van Turnhout, and U.S. Pat. Nos. 4,375,718 and 5,401,446 to Wadsworth et al., U.S. Pat. No. 4,588,537 to Klasse et al., and U.S. Pat. No. 4,592,815 to Nakao. Electrets formed by the methods described in this document are suitable for use as, e.g., electrostatic elements in electro-acoustic devices such as microphones, headphones and speakers, fluid filters, dust particle control devices in, e.g., high voltage electrostatic generators, electrostatic recorders, respirators (e.g., prefilters, canisters and replaceable cartridges), heating, ventilation, air conditioning, and face masks.

Figure 5:
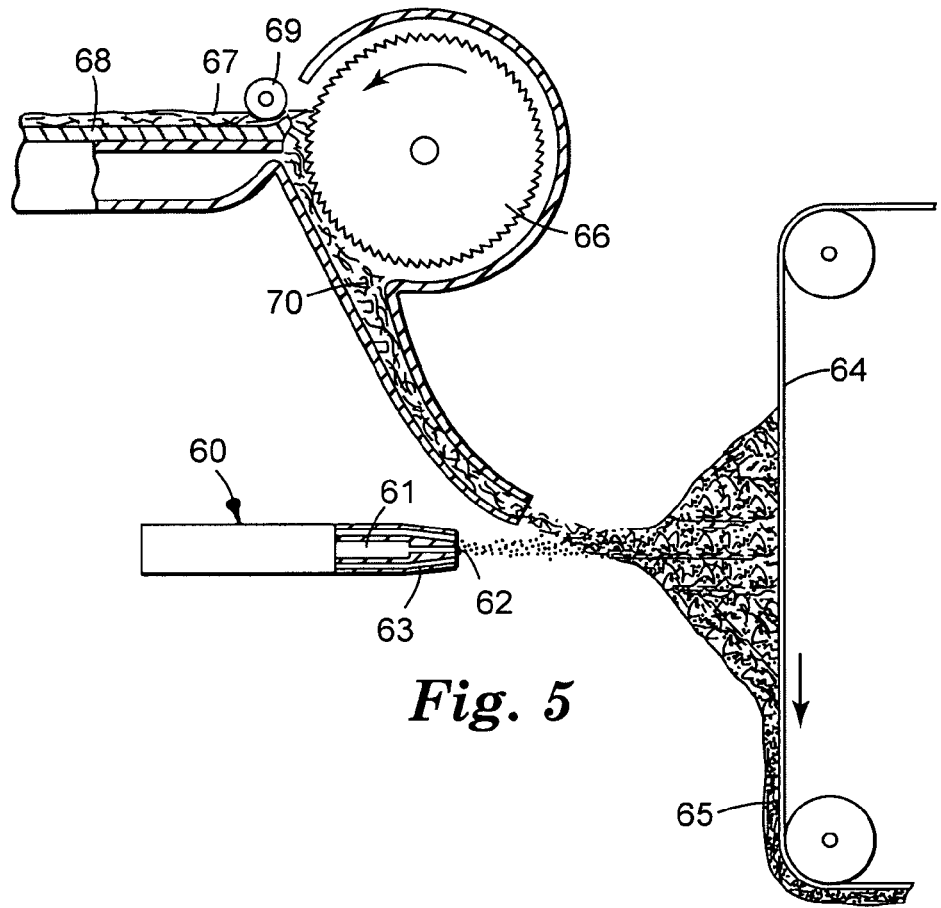
FIG. 5 is a side partial cross-section of an apparatus useful in making a nonwoven microfiber web.

Nonwoven microfiber webs useful in the present invention may be prepared using an apparatus as shown in FIG. 5. Such an apparatus includes a die 60 that has an extrusion chamber 61 through which liquefied fiber-forming material is advanced. Die orifices 62 may be arranged in line across the forward end of the die and through which the fiber-forming material is extruded. A gas, typically heated air, may be forced at high velocity through cooperating gas orifices 63. The high velocity gaseous stream draws out and attenuates the extruded fiber-forming material, whereupon the fiber-forming material solidifies as microfibers during travel to a collector 64 to form web 65.

When staple fibers are present in the web, they may be introduced through use of a lickerin roll 66 disposed above the microfiber blowing apparatus as shown in FIG. 5. A web 67 of staple fibers, typically a loose, nonwoven web such as prepared on a garnet or RANDO-WEBBER apparatus, is propelled along table 68 under drive roll 69 where the leading edge engages against the lickerin roll 66. The lickerin roll 66 picks off fibers from the leading edge of web 67 separating the fibers from one another. The picked fibers are conveyed in an air stream through an inclined trough or duct 70 and into the stream of blown microfibers where they become mixed with the blown microfibers. When particulate matter is to be introduced into the web it may be added using a loading mechanism similar to duct 70.

Hydrocharging may be carried out by contacting the web with an aqueous liquid sufficient to provide the web with filtration enhancing electret charge. The pH and conductivity of the aqueous liquid are selected based on the zeta potential of the article. The aqueous liquid contact may be achieved by spraying, soaking, condensing, etc., the aqueous liquid on the polymeric article to be charged. If a sprayer is used, the pressure necessary to achieve optimum results may vary depending on the type of sprayer used, the type of polymer from which the article is formed, the thickness and density of the article, and whether pretreatment such as corona discharge treatment was carried out before hydrocharging. Generally, pressures in the range of about 10 to 500 psi (69 to 3450 kPa) are suitable. The aqueous liquid is selected to have a conductivity of about 5 to 9,000 microS/cm, when the zeta potential of the article is −7.5 mV or less. When the zeta potential is greater than −7.5 mV, then the contacting liquid has a conductivity of about 5 to 5,500 microS/cm. Under either situation, the conductivity typically would be about 7 to 3,000 microS/cm, and still more typically about 10 to 1,000 microS/cm. When the conductivity is at lower values, there is greater relative process variability in maintaining a target conductivity in a continuous process. Thus, for example, if the target conductivity is 7 microS/cm, there may be variability of about plus or minus (+/−) 4 microS/cm. The same variability may be exhibited at higher conductivities (e.g. >100) but the percent difference is less. Distilled or deionized water is preferable to tap water. The aqueous liquid may be purified water, made through, for example, distillation, reverse osmosis, or deionization rather than simply tap water. Purified water is preferred because non-pure water can contain uncontrolled organic or inorganic impurities that can hinder effective fiber charging. Water has a dipole moment of about 1.85 Debye and has a dielectric constant of 78-80, and the aqueous liquid may have a dipole moment of at least 0.5 Debye. The aqueous liquid will contain at least 40%, more typically 60%, and still more typically 80% water by volume. Preferably, the aqueous liquid will contain essentially 100% water by volume. The aqueous charging liquid may be essentially pure water that contains a small amount of other ingredients or additives. Conductivity, the inverse of electrical resistance, may be measured using a conductivity meter and is described in micro Siemens/centimeter.

The liquid jets or liquid droplet streams can be provided by essentially any suitable spray means. The apparatus useful for hydraulically entangling fibers are generally useful in the method of the present invention, although operation is carried out at lower pressures in hydrocharging than generally used in hydroentangling.

Figure 6:
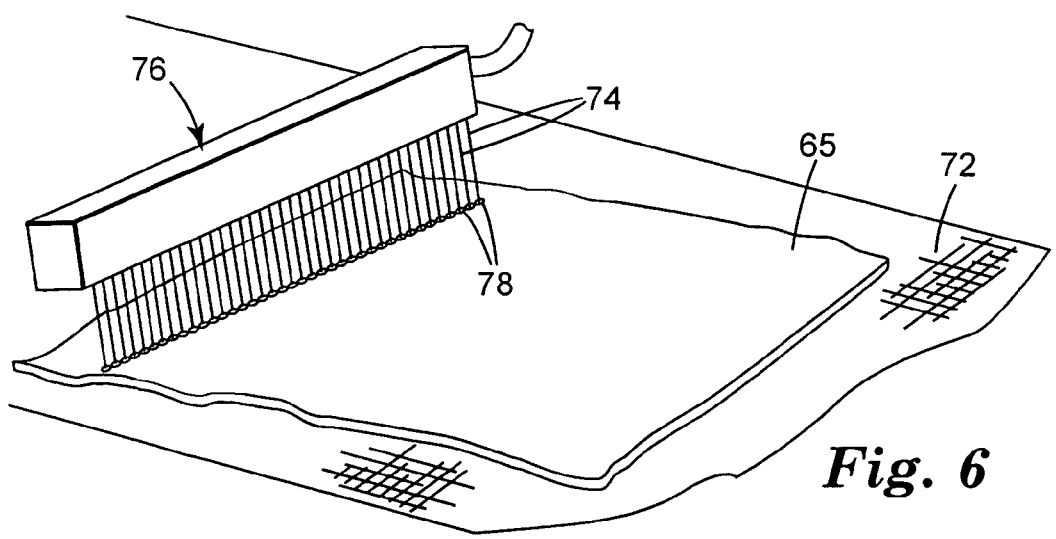
FIG. 6 is a perspective view of a liquid jet spray apparatus that may be used in making electret articles in connection with the present invention.

FIG. 6 shows an example of a suitable spray means where a fibrous web 65 is transported on support means 72 below fluid jets 74. The transport means may be in the form of a belt, preferably porous, such as a mesh screen or fabric. The fluid jets 74 emanate from a jet head 76 to impinge on web 65 at impingement points 78'. A vacuum may be provided beneath a porous support to aid in passage of the aqueous liquid through the web and to reduce drying energy requirements.

Other examples of spray means suitable for use in the method of the present invention include nebulizers where the aqueous liquid, provided through fluid line, and pressurized air, provided through air line, are supplied to a nozzle to provide a spray mist to impact the article-to-be-charged and pump action sprayers where a pump handle forces liquid provided by the supply means through the nozzle to provide a spray mist. Further description of this method of providing water contact is provided in U.S. Pat. No. 6,119,691 to Ang-adjivand et al. Alternatively, the article to be charged can be contacted with aqueous liquid using a variety of other apparatus, including the apparatus described in U.S. Pat. No. 6,406,657 to Eitzman et al., U.S. Pat. No. 6,375,886 to Ang-adjivand et al., U.S. Pat. No. 6,454,986 to Eitzman et al., and U.S. Pat. No. 6,824,718 to Eitzman et al.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Conductivity Measurement

The conductivity of each hydrocharging fluid used for each Example or Comparative Example was measured at room temperature using an ORION 3-Star Conductivity Meter (Thermo Fisher Scientific, Inc., Waltham, Mass.). Other conductivity measuring instruments may provide equivalent results.

pH Measurement

The pH of each hydrocharging fluid used for each Example or Comparative Example was measured at room temperature using an automatic temperature compensated ORION 3-Star pH Meter with a Triode pH/ATC Combination Electrode (both from Thermo Fisher Scientific, Inc., Waltham, Mass.); (other pH meters may provide equivalent results). As described in the literature (ASTM D 5464-07 Standard Test Method for pH Measurement of Water of Low Conductivity; ASTM D 5128-90(2005) Standard Test Method for On-Line pH Measurement of Water of Low Conductivity; "Back to Basics-Measuring pH in High Purity Water", W. F. Harfst, *Ultrapure Water*, October 1994, p 75.) measurement of the pH of very high purity water can be challenging due to its low conductivity and resulting weak electrical signal in addition to its susceptibility to contamination from the environment, especially from $CO_2$. As suggested in ASTM D 5464-07, measurements of pH on solutions with conductivities below 2 microS/cm are particularly challenging. In practice, low conductivity pH measurements (<100 microS/cm) should be taken on-line just before contacting the article-to-be-charged as recommended in ASTM D5128-90(2005) to prevent environmental contamination. Continuous pH measurements are preferred for continuous charging processes. Measurements herein were taken as quickly as possible after each hydrocharging fluid was prepared in order to minimize the effects indicated above; however, in consideration of the challenge of measuring pH at low conductivity, for charging liquid with conductivities measured to be 2 microS/cm or less, the pH measurements were considered to be nominal values only.

Proton Affinity Test

The computational chemistry methods are referred to as density functional theory, (DFT), (Kohn, W., 71 *Rev. Mod. Phys.*, 1253 (1999)) methods. We use the Kohn-Sham formalism (Kohn, W.; Sham, L. J., 140 *Phys. Rev.*, A1133 (1965)) as implemented in NWChem version 5.0 (Bylaska, E. J. et al *NWChem, A Computational Chemistry Package for Parallel Computers*, Version 5.0 (2006), Pacific Northwest National Laboratory, Richland, Wash. 99352-0999, USA.) and the details of the calculation are defined by specific exchange-correlation functional and one-electron basis set (Hehre, W. J.; Radom, L.; Schleyer, P. v. R.; Pople, J. A. *Ab Initio Molecular Orbital Theory*, Wiley: New York (1986)). We use the standard slash-notation to define the specific method (Foresman, J. B.; Frisch, Æin *Exploring Chemistry with Electronic Structure Methods* $2^{nd}$ Ed., (1996))). For example, the computational method, B3LYP/MIDI!, would mean that we used the B3LYP exchange-correlation functional (Stephens, P. J.; Devlin, F. J.; Chabalowski, C. F.; Frisch, M. J., 98 *J. Phys. Chem.* 11623 (1994) and the MIDI! one-electron basis set (Easton, R. E.; Giesen, D. J.; Welch, A.; Cramer, C. J.; Truhlar, D. G. 93 *Theor. Chem. Acc.* 1432 (1996) ). The computational requirements of a calculation are largely determined by the size of the one-electron basis set, where a larger basis set is often more accurate but may be prohibitively expensive. One of the challenges in computational chemistry is to determine what level of theory, i.e. exchange-correlation functional and basis set, produces acceptable results within a reasonable amount of time.

A number of properties may be computed using the DFT methods. The properties that we calculated are the electronic energy, molecular geometry, and vibrational modes. The molecular geometry was calculated by minimizing the electronic energy of the system with respect to the nuclear coordinates. The vibrational frequencies were calculated by first minimizing the geometry and calculating the second derivatives with respect to the nuclear coordinates. The vibrational calculations were important for computing the zero-point vibrational and thermal energy corrections. The vibrational frequencies and geometry calculations are computationally more demanding than the energy calculations. As such, we used smaller basis sets to optimize the geometry and calculate the harmonic frequencies.

The proton affinity, (Gal, J.-F.; Maria, P.-C.; Raczynska, E. D., 36 *J. Mass Spectrom.* 699 (2001)) PA, was calculated using density functional theory, DFT. PA is a gas-phase thermodynamic property defined as:

PA=the enthalpy released when a proton is attached to a molecule.

$$X + H^+ \rightarrow XH^+ \quad PA = -\Delta H_{PA} \qquad (1)$$

It is important to note that the PA is the negative of the enthalpy change for the protonation process; therefore a larger PA value corresponds to a more exothermic process.

Molecules may have more than one protonation site; thus, all possible sites were examined, and the PA for the most basic site is reported, where the most basic site is defined as the site with the largest PA.

All of the calculations were carried out with NWChem version 5.0. The PA is calculated by following the procedure (steps 1-7) listed below and is computed for T=298.15 K.

(1) Optimize the geometry for the neutral molecule with the B3LYP functional and the MIDI! basis set.

(2) Calculate the harmonic frequencies at the optimized geometry using the B3LYP/MIDI! method. These frequencies are used to calculate the thermal and zero-point energy corrections, which are denoted $E_T$ and $E_{ZPE}$, respectively.

(3) The electronic energy is calculated with the PW6B95 functional (Zhao, Y.; Truhlar, D., 109 *J. Phys. Chem. A* 5656 (2005) and the 6-31+G(d,p) basis set (Hehre, W. J.; Radom, L.; Schleyer, P. v. R.; Pople, J. A., *Ab Initio Molecular Orbital Theory*, Wiley: New York (1986)) at the geometry that was optimized in (1). This energy is denoted as $E_{elec}$.

(4) The total energy for the neutral molecule, $E_N$, is $E_N = E_{elec} + E_T + E_{ZPE}$.

(5) The terms $E_{elec}$, $E_T$, and $E_{ZPE}$ are calculated for the protonated species by following steps 1-4, and the energy of the protonated species, $E_P$, is computed as $E_P = E_{elec} + E_T + E_{ZPE}$.

(6) A bare proton has no electronic or zero-point energy, but it does have thermal energy equal to 5/2 RT, where R is the universal gas constant and T is the temperature. Thus, the energy of a proton, $E_{H+} = 5/2$ RT.

(7) As described in eq. 1, $PA = E_{H+} + E_N - E_P$.

The methods that were chosen have been validated against a set of experimental PAs. The experimental data were taken from the NIST Webbook (Lias, S.; Bartness, J. E., *Gas Phase Ion Thermochemistry* in NIST Chemistry WebBook, NIST Standard Reference Database Number 69, Eds. P. J. Linstrom and W. G. Mallard, June 2005, National Institute of Standards and Technology, Gaithersburg Md., 20899 (http://webbook.nist.gov)) and are listed in Table 1. The data were chosen by diversity of the chemical structure and not by the accuracy of the measurement. In multiple cases, the experimental errors are larger than the calculated errors. Nevertheless, the data were included. The size of the dataset was also limited by not including chemically redundant structures. For example, the data for $CH_3NH_2$ were included, but all of the experimental data for $CH_3(CH_2)_nNH_2$ (n≧1) were excluded. By excluding redundant data, the database does not unfairly weight any one type of molecule; thus, the validation is more objective. The calculated values for PA are given in Table 1, along with the mean unsigned error (also known as "mean absolute deviation"), MUE, for the PW6B95/6-31+G(d,p) method. The MUE for PA is 1.8 kcal/mol. This error is expected to be further reduced by increasing the basis set and/or improving the geometry.

Deprotonation Enthalpy Determination:

The deprotonation enthalpy, (Gal, J.-F.; Maria, P.-C.; Raczynska, E. D.; 36 *J. Mass Spectrom.* 699 (2001), $\Delta H_{dp}$, was also calculated using density functional theory, DFT. The $\Delta H_{dp}$ gas-phase thermodynamic properties are defined below.

$\Delta H_{dp}$ = the enthalpy required to remove a proton from a molecule.

$$XH \rightarrow X^- + H^+ \quad \Delta H_{dp} \quad (2)$$

In the case of molecules with multiple acidic protons, all deprotonation sites were examined, and the $\Delta H_{dp}$ value for the most acidic proton is reported, where the most acidic proton is the proton that has the lowest $\Delta H_{dp}$.

All of the calculations were carried out with NWChem version 5.0. The $\Delta H_{dp}$ is calculated using the following procedure and is computed for T=298.15 K.

1. $E_N$ is computed as described in the above section.

2. The terms $E_{elec}$, $E_T$, and $E_{ZPE}$ are calculated for the deprotonated species by following steps 1-4 in the above section. The energy of the deprotonated species, $E_D$, is computed as $E_D = E_{elec} + E_T + E_{ZPE}$.

3. A bare proton has no electronic or zero-point energy, but it does have thermal energy equal to 5/2 RT, where R is the universal gas constant and T is the temperature. Thus, the energy of a proton, $E_{H+} = 5/2$ RT.

4. As described in equation (2) above, $\Delta H_{dp} = E_N - E_D - E_{H+}$.

As with the PA, the $\Delta H_{dp}$ values were calibrated against a set of experimental data that was taken from the NIST dataset, and the data are given in Table 1. The calculated values for $\Delta H_{dp}$ are also given in Table 1. The mean unsigned error in the calculated values is 1.7 kcal/mol, which is similar to the error for the calculated PA.

TABLE 1

Experimental and calculated PAs and $\Delta H_{dp}$ in kcal/mol.

| Molecule | PA NIST | PA DFT | $\Delta H_{deprotonation}$ NIST | $\Delta H_{deprotonation}$ DFT |
|---|---|---|---|---|
| Acetic Acid | 187.3 | 189.2 | 348.1 ± 2.2 | 347.5 |
| p-Aminobenzoic Acid | 206.7 | 210.9 | 343.4 ± 2.1 | 344.6 |
| 2-Amino-Phenol | 214.8 | 216.3 | | |
| 4-Amino-Phenol | | | 352.5 ± 2.1 | 352.3 |
| Ammonia | 204.0 | 206.8 | 403.6 ± 0.8 | 407.3 |
| Aniline | 210.9 | 211.3 | 366.4 ± 2.1 | 368.4 |
| Benzene | 179.3 | 182.7 | 401.7 ± 0.50 | 402.0 |
| Diphenylamine | | | 350.8 ± 2.1 | 352.2 |
| Methane | 129.9 | 130.7 | 418.0 ± 3.5 | 423.0 |
| Methanol | 180.3 | 180.5 | 382.0 ± 1.0 | 381.7 |
| Methylamine | 214.9 | 217.0 | 403.2 ± 0.8 | 404.6 |
| N-Methyl-Aniline | 219.1 | 217.3 | 364.8 ± 2.1 | 366.6 |
| 2-Methyl-Benzenamine | 214.1 | 216.2 | 366.8 ± 2.1 | 368.8 |
| 3-Methyl-Pyridine | 225.5 | 227.2 | 377.9 ± 3.1 | 377.7 |
| 4-Methyl-Pyridine | 226.4 | 228.4 | 369.8 ± 5.1 | 371.8 |
| N-Methyl-Methanamine | 222.2 | 223.2 | 395.1 ± 2.0 | 394.2 |
| Piperidine | 228.0 | 230.1 | | |
| Phenol | 195.3 | 197.3 | 350.0 ± 2.0 | 348.0 |
| Pyridine | 222.0 | 222.8 | 391.0 ± 2.5 | 392.1 |
| p-Toluidine | 214.3 | 214.7 | 367.3 ± 2.1 | 369.6 |
| Triazine | 202.9 | 201.2 | | |
| Trimethylamine | 226.8 | 226.8 | | |
| N,N,4-Trimethyl benzamide | 221.6 | 225.9 | | |
| Water | 165.0 | 165.5 | 390.3 | 391.9 |
| Mean Unsigned Error | | 1.8 | | 1.7 |

Zeta Potential Test

To measure the Zeta Potential an EKA ELECTRO KINETIC ANALYZER, commercially available from Anton Paar GmbH, Graz, Austria was used in these Examples. Other instruments, using the protocol set forth below, should provide comparable measurements. The electrical potential difference at zero electric current caused by the flow of liquid under a pressure gradient may be measured as the liquid flows through a capillary, plug, diaphragm, or membrane. The difference may be measured between the ends of the capillary, across the plug, or on opposing sides of the diaphragm or membrane. When an electrolyte solution is forced though a porous plug of material, a streaming potential develops due to the motion of ions in the diffusion layer, and it can be measured by an Electro Kinetic Analyzer (EKA). The streaming potential may then be used to calculate the zeta potential as described below. A general review of electrokinetic measurement techniques is found in *Pure Appl. Chem.*, Vol. 77, No. 10, pp. 1753-1805, 2005. *Measurement And Interpretation Of Electrokinetic Phenomena* (IUPAC Technical Report).

The EKA instrument includes an analyzer, a 20 mm diameter Cylindrical Sample Cell, Ag/AgCl reversible electrodes, and a data control system. The analyzer includes a pump to produce the pressure required to pass an electrolyte solution, generally potassium chloride, from a reservoir, through the measuring cell containing a sample of the filter medium described herein. Sensors for measuring temperature, pressure drop, conductivity and pH are disposed externally of the cell. The electrolyte solution is pumped through the porous material. As the electrolyte solution passes through the sample, a displacement of charge occurs. The resulting streaming potential and/or streaming current can be detected by means of the electrodes, placed at each end of the sample. The zeta potential of the sample is then determined by a calculation according to the method of Fairbrother and Mastin (F. Fairbrother, H. Mastin, *Studies in electro-endosmosis*, 125 J. CHEM. SOC. 2319-30 (1924)) that takes into account the conductivity of the electrolyte. The EKA system was remotely controlled by a data acquisition computer running Visiolab Control And Evaluation Software version 1.0. for the EKA also available from Anton Paar GmbH. The Visiolab software included values for temperature corrected dynamic viscosity and permittivity. The EKA was connected to a Remote Titration Unit (RTU) for automatic titration by computer control. Deionized (DI) water was used for each test and was generated onsite using a MILLI-Q PLUS Model ZD4011584-4 Four Cartridge water purification system, from Millipore Corporation, Billerica, Mass., using an Organex-Q cartridge, which removes organic contaminants.

The general procedures from the EKA's Operations Manual, Instruction Handbook and the VISIOLAB's Instruction Manual were followed. Specifically, each web sample to be tested was folded into a 10 layer stack that was then cut into a 13/16 inch (20.6 millimeter) diameter circular disc, typically weighing about 0.2 grams. Samples were handled with tweezers to minimize contamination. Each sample was placed into the EKA sample cell, and the 2 parallel electrodes were adjusted to be about 3 millimeters (mm) apart, being careful not to over tighten the adjusting screws. This results in sample bulk density of about 20% that of the density of pure polypropylene, which allows one to use the Fairbrother and Mastin analysis technique.

The sample cell was then attached onto the EKA unit, and its electrical contacts and plumbing connections were connected. About 400+/−20 milliliters (ml) of fresh deionized (DI) water was added to the reservoir beaker, which was gently stirred using a stir-bar throughout the test to ensure thorough mixing. The EKA's pump was set to "bypass" mode to draw water into the EKA plumbing while its inlet tube and probe assembly were lowered into the reservoir beaker to keep the beaker cover from contacting the water in the beaker. After filling the EKA's pump and associated plumbing, water was pumped through the sample cell in alternate directions to flush trapped air from within the sample cell from the system. Because there was no method to inert the system, other than covering the solution reservoir (e.g. no nitrogen flush), some incorporation of carbon dioxide from the air may occur over time. Thus, the minimum amount of flushing through the fresh sample was done to get the bulk of the air out, and each test was initiated as quickly as reasonable to minimize the potential for any increase in conductivity and decrease in pH due to the conversion of any dissolved carbon dioxide into carbonic acid.

This following are the test parameters entered into the VISIOLAB program:
Sample Settings:
  Measurement Type: Automatic Titration
  Evaluation Method: Fairbrother-Mastin
  Electrolyte: KCl (aqueous)
  Molecular Weight: 18.02 g/mol
  Start Concentration: 0.001 Moles/liter (mol/L)
  Start Volume: 400 ml
  Viscosity: $H_2O$
  Dielectric Constant: $H_2O$
Pressure Program:
  Max. Pressure: 500 millibar (mbar)
  Time: 60 s
  Measure: Voltage
  Number of Repetitions: 2
Rinse Program:
  Max. Pressure: 400 mbar
  Time Bypass: 10 seconds (s)
  Time Cell: 15 s
  Number of Repetitions: 1
Automatic Titration Program:
  Titration Type: Conductivity
  Used Syringe: RTU1 Left (KCl (aqueous), 1.0 mol/L
  Desired Conductivity Difference: 50 microS/cm
  Start Volume: 0.25 mL
  Use Conductivity Limits
    Conductivity Minimum: 1 microS/cm
    Conductivity Maximum: 3000 microS/cm The programmed test procedure has an automatic flush cycle to further remove air from the system. A conductivity titration was preformed, using the Automatic Titration Program and a 1 mol/L KCl solution. Thus, pH was not adjusted during the test, however the measured pH ranged from 4-6 during a typical test. The typical sample run was made with a minimum step of 50 microS/cm and a first shot of 0.25 mL of 1 molar KCl solution.

Before each test was initiated, the conductivity of the starting solution in the cell was measured to ensure that it was less than 10 microS/cm to ensure that the deionized water was indeed pure. If the conductivity was found to be greater than 10 microS/cm, the test was aborted. Once the system parameters were properly programmed and checked, the experiment was started. A full experiment typically required 6-7 hours to complete.

After each test was completed, the sample cell was flushed repeatedly before removing it from the EKA with DI water to flush out the high conductivity electrolyte remaining in the system from the completed test until the conductivity was found to be below 20 microS/cm. The sample cell and circulating circuit was drained to reduce carry-over to the next sample. The sample cell, electrodes, and sample were removed, being careful not to scratch the Ag/AgCl electrodes. Finally, the cell was again flushed well with DI water before the fresh sample was inserted.

Zeta Potential Evaluation: The EKA system calculates the zeta potential of the sample from direct measurement of the streaming potential and the specific electrical conductivity of the applied electrolyte using the Fairbrother-Mastin approach.

$$\zeta = \frac{dU}{dp} \cdot \frac{\eta}{\varepsilon \cdot \varepsilon_0} \times 10^{-8}$$

Where:
  $\zeta$[mV] is the zeta potential;
  dU/dp [mV/mbar] is the slope of the streaming potential versus pressure;

η[mPa·s] is the electrolyte viscosity;

∈[As/Vm] is the dielectric constant of the electrolyte; and

∈₀[As/Vm] is the permittivity of free space.

We adopt the convention that the sign of the zeta potential for each fibrous web sample is that of the value reported by the EKA instrument. During a typical conductivity scan, the zeta potential tends initially either to rise or fall and then reach a plateau value as the magnitude of the electrolyte solution's conductivity rises to above about 500 microS/cm. The average value of this zeta potential plateau level between the conductivities of 1000 microS/cm and 2000 microS/cm was taken as the zeta potential measurement value for each sample tested. To verify accurate results, the procedure may be repeated.

Quality Factor (QF) Test

The meltblown microfiber samples were each tested for % DOP aerosol penetration (% Pen) and pressure drop (ΔP), and the quality factor (QF) was calculated. The filtration performance (% Pen and QF) of the nonwoven microfiber webs were evaluated using an Automated Filter Tester AFT Model 8127 (available from TSI, Inc., St. Paul, Minn.) using dioctylphthalate (DOP) as the challenge aerosol and a MKS pressure transducer that measured pressure drop (ΔP (mm of H₂O)) across the filter. Other filter testing instruments may provide comparable measurements using the protocol set forth below. The DOP aerosol is nominally a monodisperse 0.3 micrometer mass median diameter having an upstream concentration of 70-110 mg/m³. The aerosol was forced through a sample of filter media at a calibrated flow rate of 42.5 liters/minute (face velocity of 6.9 cm/s) with the aerosol ionizer turned off. The total testing time was 23 seconds (rise time of 15 seconds, sample time of 4 seconds, and purge time of 4 seconds). The concentration of DOP aerosol was measured by light scattering both upstream and downstream of the filter media using calibrated photometers. The DOP % Pen is defined as: % Pen=100×(DOP concentration downstream/DOP concentration upstream). For each material, 6 separate measurements were made at different locations on the blown microfiber (BMF) web and the results were averaged.

The % Pen and ΔP were used to calculate a QF by the following formula:

$$QF = -\ln(\% \text{ Pen}/100)/\Delta P,$$

where in stands for the natural logarithm. A higher QF value indicates better filtration performance, and decreased QF values effectively correlate with decreased filtration performance.

The following examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

TABLE 2

Material Abbreviations

| Abbreviation or Trade Designation | Description |
|---|---|
| Charge Additive-1 | 2,4,6-trianilino-p-(carbo-2'-ethylhexyl-1'-oxy)-1,3,5-triazine commercially available as "UVINUL T-150" from BASF, Ludwigshafen, Germany. |
| Charge Additive-2 | 4,4'-[[6-[[4-[[(1,1-dimethylethyl)amino]carbonyl]phenyl]amino]-1,3,5-triazine-2,4-diyl]diimino]bis-benzoic acid bis(2-ethylhexyl) ester, commercially available as "UVASORB HEB" from 3V, Bergamo, Italy. |
| Charge Additive-3 | 2,4,6-trianilino(p-carbo-tetradecyl-oxy)-1,3,5-triazine prepared as described in the Synthesis Section below. |
| Charge Additive-4 | N,N',N''-tris(4-octadecylphenyl)-1,3,5-triazine-2,4,6-triamine prepared as described in the Synthesis Section below. |
| Charge Additive-5 | N,N',N''-trioctadecyl-1,3,5-triazine-2,4,6-triamine prepared as described in the Synthesis Section below. |
| Charge Additive-6 | Poly[[6-[(1,1,3,3-tetramethylbutyl)amino]-1,3,5-triazine-2,4-diyl]][(2,2,6,6-tetramethyl-4-piperidinyl)imino]-1,6-hexanediyl[(2,2,6,6-tetramethyl-4-piperidinyl)imino]]) commercially available as "CHIMASSORB 944" from Ciba Specialty Chemicals, Basel, Switzerland. |
| Charge Additive-7 | 2',3-bis[[3-[3,5-di-tert-butyl-4-hydroxyphenyl]propionyl]]propionohydrazide commercially available as "IRGANOX MD1024" from Ciba Specialty Chemicals, Basel, Switzerland. |
| Charge Additive-8 | Tetrakis(2,4-di-tert-butylphenyl)[1,1-biphenyl]-4,4'-diylbisphosphonite commercially available as "IRGAFOS P-EPQ" from Ciba Specialty Chemicals, Basel, Switzerland. |
| Charge Additive-9 | 3,9-bis(2,4-di-tert-butylphenoxy)-2,4,8,10-tetraoxa-3,9-diphosphaspiro[5.5]undecane commercially available as "IRGAFOS 126" from Ciba Specialty Chemicals, Basel, Switzerland. |
| Charge Additive-10 | 2,4,8,10-Tetraoxa-3,9-diphosphaspiro[5.5]undecane, 3,9-bis[2,6-bis(1,1-dimethylethyl)-4-methylphenoxy]-commercially available as "ADK STABILIZER PEP-36" from Amfine Chemical Company, Upper Saddle River, NJ. |
| Charge Additive-11 | Tris-(2,4-di-tert-butylphenyl)phosphite commercially available as "IRGAFOS 168" from Ciba Specialty Chemicals, Basel, Switzerland. |
| Charge Additive-12 | Phosphorous acid, bis[2,4-bis(1,1-dimethylethyl)-6-methylphenyl]ethyl ester commercially available as "IRGAFOS 38" from Ciba Specialty Chemicals, Basel, Switzerland. |

TABLE 2-continued

Material Abbreviations

| Abbreviation or Trade Designation | Description |
|---|---|
| Charge Additive-13 | Dioctadecyl 3,3'-thiodipropionate commercially available as "IRGANOX PS 802" from Ciba Specialty Chemicals, Basel, Switzerland. |
| Charge Additive-14 | Benzenepropanoic acid, 3,5-bis(1,1-dimethylethyl)-4-hydroxy-, 2,2-bis((3-(3,5-bis(1,1-dimethylethyl)-4-hydroxyphenyl)-1-oxopropoxy)methyl)-1,3-propanediyl ester commercially available as "IRGANOX 1010" from Ciba Specialty Chemicals, Basel, Switzerland. |
| Charge Additive-15 | 1,3,5-tris(4-n-dodecylanilio)benzene prepared as described in the Synthesis Section below. |
| PP-1 | Polypropylene resin grade 1, TOTAL PP3960, commercially available from Total Petrochemicals USA Inc., Houston, TX. |
| PP-2 | Polypropylene resin grade 2, TOTAL PP3860, commercially available from Total Petrochemicals USA Inc., Houston, TX. |
| PP-3 | Polypropylene resin grade 3, TOTAL PP3941W, commercially available from Total Petrochemicals USA Inc., Houston, TX. |
| PP-4 | Polypropylene resin grade 4, ESCORENE PP 3746G, commercially available from Exxon-Mobil Corporation, Irving, TX. |
| PE | Polyethylene (linear low density) resin, DOWLEX 2503, commercially available from Dow Chemical Company, Midland, MI. |
| PMP | Poly(4-methyl-1-pentene) resin, TPX DX-820, commercially available from Mitsui Chemicals, Inc., Tokyo, Japan. |
| PLA | Polylactide resin, 6251D, commercially available from NatureWorks LLC, Minnetonka, MN. |
| COC | Cyclic olefin copolymer, TOPAS 8007-F04, commercially available from TOPAS Advanced Polymers, Frankfurt, Germany. |

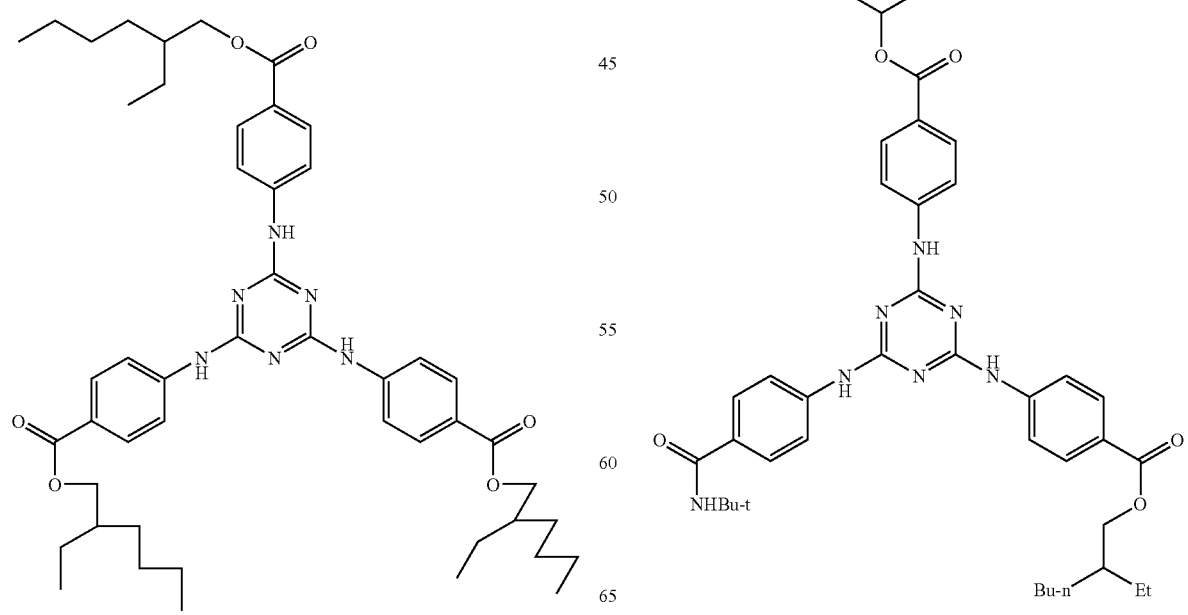

Charge Additive-1

-continued

Charge Additive-2

Charge Additive-3
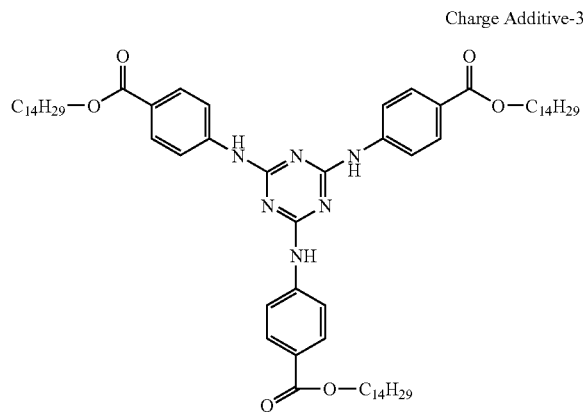
Charge Additive-4
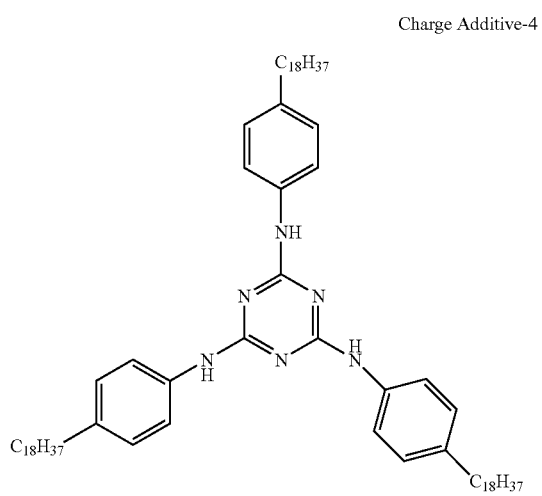
Charge Additive-5
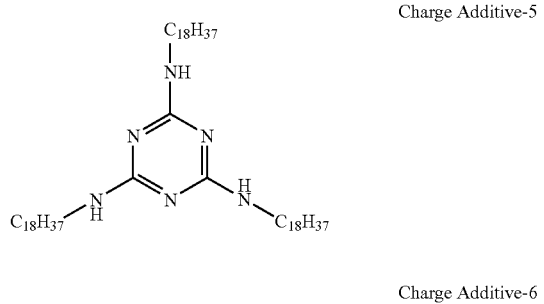
Charge Additive-6
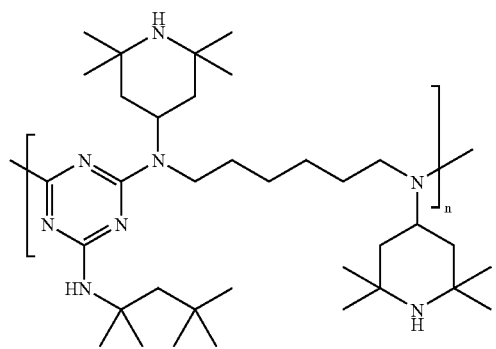
Charge Additive-7
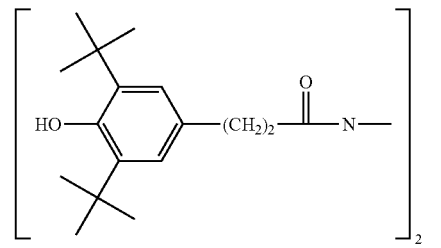
Charge Additive-8
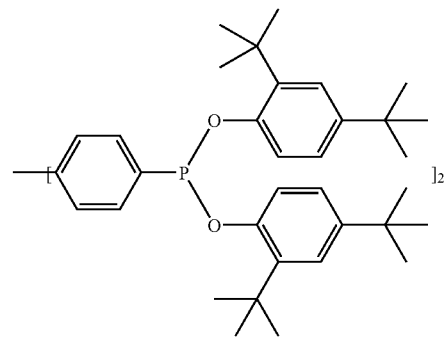
Charge Additive-9
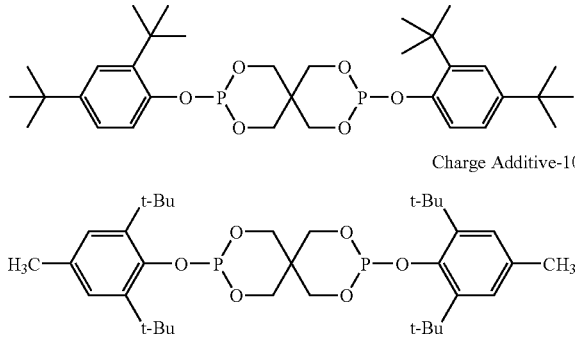
Charge Additive-10
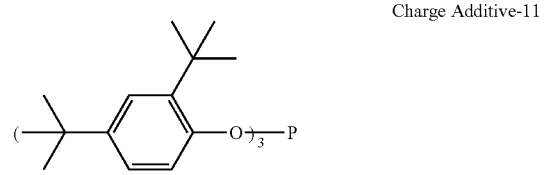
Charge Additive-11
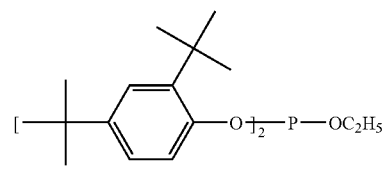
Charge Additive-12
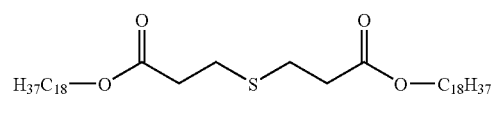
Charge Additive-13

-continued

Charge Additive-14

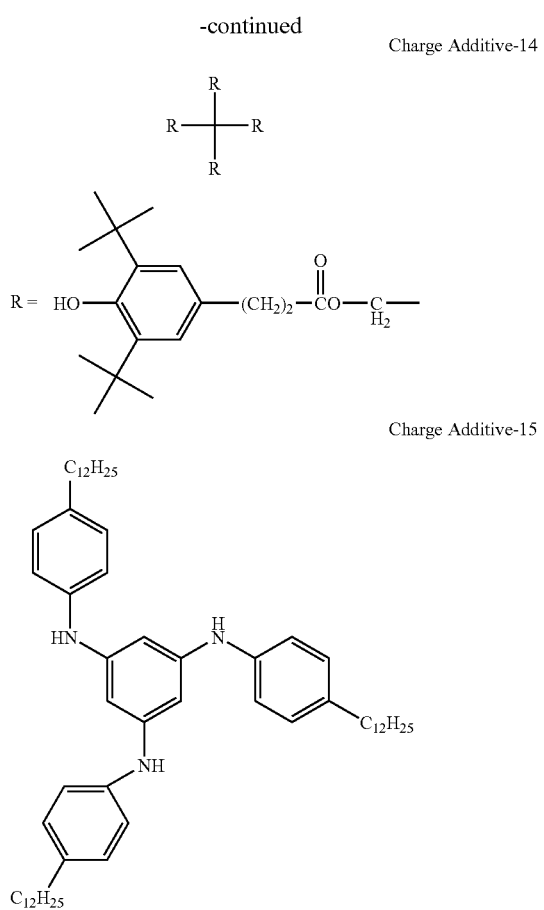

Charge Additive-15

SYNTHESIS EXAMPLES

Synthesis Example 1

Preparation of Charge Additive 3

Under a nitrogen atmosphere, a mixture of 1-tetradecanol (96.3 grams, 449 millimoles (mmol), pyridine (40 milliliters), and dichloromethane (1000 milliliters) was heated to 30° C. 4-Nitrobenzoyl chloride (100 grams, 539 mmol) was added in portions over a twenty minute period. The reaction mixture was heated to reflux for sixteen hours. The reaction mixture was then washed twice with water (2×500 milliliters). The organic layer was concentrated under reduced pressure to a yellow solid. One thousand (1000) milliliters of hexane was added, and the mixture was heated to reflux. The mixture was cooled and concentrated to yield a yellow solid that was filtered. The yellow solid was recrystallized twice from ethanol to obtain 77.0 grams of tetradecyl 4-nitrobenzoate as yellow crystals.

Under a nitrogen purge, 10% platinum on carbon (2.5 grams) was added to a mixture of tetradecyl 4-nitrobenzoate (25 grams, 69 mmol) and ethyl acetate (250 milliliters) in a Parr vessel. The vessel was placed under hydrogen pressure (49 psi, $3.3 \times 10^5$ Pa) for sixteen hours. Dichloromethane was added and the reaction mixture was filtered through a layer of CELITE filter aid. The filtrate was concentrated under reduced pressure to a tan solid. The solid was recrystallized from ethanol to obtain 15 grams of tetradecyl 4-aminobenzoate as light tan needles.

Under a nitrogen atmosphere, a mixture of tetradecyl 4-aminobenzoate (45.6 grams, 137 mmol) and cyanuric chloride (8.40 grams, 45.6 mmol) in xylene (460 milliliters) was heated to reflux for twenty-four hours. The reaction mixture was cooled to 90° C. and washed with saturated aqueous sodium bicarbonate (2×500 milliliters), followed by water (3×500 milliliters). A white precipitate formed as the xylene cooled overnight. The white precipitate was isolated by filtration and washed with excess xylene. The solid was recrystallized twice from 34:66 dichloromethane:methanol (750 milliliters) and once from xylene (300 milliliters) to provide 27.6 grams of 2,4,6-trianilino(p-carbo-tetradecyl-oxy)-1,3,5-triazine as a white solid.

Compositional Analysis: Calculated for $C_{66}H_{102}N_6O_6$: % C, 73.70; % H, 9.56; % N, 7.81. Found: % C, 73.44; % H, 9.37; % N, 7.62.

Synthesis Example 2

Preparation of Charge Additive 4

Under a nitrogen atmosphere, a mixture of 4-octadecylanaline (50 grams, 145 mmol) and cyanuric chloride (8.9 grams, 48 mmol) in xylene (500 milliliters) was heated to reflux for twenty-four hours. The reaction mixture was cooled to 90° C. and washed with saturated aqueous sodium bicarbonate (2×500 milliliters) followed by water (2×500 milliliters). A white precipitate formed as the xylene cooled overnight. The white precipitate was isolated by filtration and washed with excess xylene. The solid was recrystallized twice from 90:10 chloroform: methanol (500 milliliters) and once from xylene (500 milliliters) to provide 45 grams of N,N',N"-tris(4-octadecylphenyl)-1,3,5-triazine-2,4,6-triamine as a white solid.

Compositional Analysis: Calculated for $C_{75}H_{126}N_6$: % C, 81.02; % H, 11.42; % N, 7.56. Found: % C, 81.05; % H, 11.38; % N, 7.60.

Synthesis Example 3

Preparation of Charge Additive 5

Under a nitrogen atmosphere, a mixture of octadecylamine (389 grams, 1.44 mol), di(propylene glycol) dimethyl ether (1.50 liters), sodium acetate (134 grams, 1.63 mol), and cyanuric chloride (88.4 grams, 0.479 mol) was stirred for thirty minutes and then heated to 85° C. for two hours. The reaction mixture was heated to 155° C. at which temperature acetic acid was allowed to reflux out of the reaction mixture. The reaction mixture was heated to 170° C. for sixteen hours. 2-Propanol (1.60 liters) was added to the reaction mixture when it had cooled to 80° C. The precipitate was filtered at room temperature and washed with excess 2-propanol. The solid was stirred in refluxing water (2.00 liters) for two hours, filtered, and washed with excess water. The solid was stirred in refluxing 2-propanol (2.00 liters), filtered, and washed with excess 2-propanol to yield 377 grams of N,N',N"-trioctadecyl-1,3,5-triazine-2,4,6-triamine as a white solid.

Synthesis Example 4

Preparation of Charge Additive 15

To a 250 mL, three-necked round-bottomed flask fitted with magnetic stirring bar were charged phloroglucinol dehydrate (6.63 g, 97%), 4-dodecylaniline (36.40 g, 97%) and iodine (0.13 g, 99%) followed by the addition of toluene (30 mL). After the flask was equipped with Dean-Stark trap and condenser, it was then heated at 130° C. for 12 hours under constant stirring. After the temperature of the reaction mixture was allowed to cool to about 60° C. (at which the mixture was in viscous liquid form), it was slowly poured into 200 mL of ethanol to give precipitates. The precipitates were obtained as pink solids through filtration. Re-crystallization twice from ethanol (150 mL for each) afforded charge additive 1 (31.0 g, 87.8%) as light pink powders after being dried at 50° C. under vacuum (27 mmHg) overnight.

Compositional Analysis: Calculated: C, 84.15; H, 10.95; N, 4.91. Found: C, 84.28; H, 10.86, N, 4.85).

Examples 1-110 and Comparative Examples C 1-C 60

For each of the Examples and Comparative Examples, the procedures described below were followed.

Sample Preparation

Step A—Preparation of Melt-Blown Microfiber Webs:

For each Example and Comparative Example, a blown microfiber (BMF) nonwoven web was extruded using one of the polymeric resins listed in the Table of Abbreviations above, or a combination thereof, and in some cases containing one of the charging additives listed in the aforementioned table, or a combination thereof Extrusion was performed generally as described in Van A. Wente, *Superfine Thermoplastic Fibers,* 48 INDUST. ENGN. CHEM., 1342-46 and Naval Research Laboratory Report 111437 (Apr. 15, 1954) via one of the two extrusion methods detailed below. Table 3 summarizes the specific web characteristics and concentration(s) of charging additives for each of the Examples and Comparative Examples.

Extrusion Method 1: Using an extruder operating at a temperature of about 240° C.-330° C. connected to a meltblowing die having 10 holes per centimeter (25 holes per inch) and 0.38 mm (0.015 in) diameter holes, BMF webs were formed having basis weights of about 45-70 g/m$^2$, effective fiber diameters of about 6.5-15 micrometers, solidities of about 4-10%, and thicknesses of about 0.6-2.5 millimeters. Charging additives were fed directly into the extruder with the resin, either as dry powder or as 20-35 wt % concentrates.

Extrusion Method 2: Using the general method described in Example 1 of (WO/2008/016782) Monocomponent Monolayer Meltblown Web And Meltblowing Apparatus, BMF webs were formed that had a bimodal fiber size distribution and basis weights of about 50-150 g/m$^2$, effective fiber diameters of about 12-16 micrometers, solidities of about 5-8%, and thicknesses of about 0.6-2.5 millimeters. Charging additives were fed directly into the extruder with the resin either as dry powder form or as 20-35 wt % concentrates.

TABLE 3

BMF Web Characteristics

| BMF Web Number | Resin Grade | BMF Extrusion Method | Charging Additive | Charging Additive Concn. (wt %) | Effective Fiber Diam. (mm) | Solidity (%) | Basis Weight (g/m$^2$) | Thickness (mm) |
|---|---|---|---|---|---|---|---|---|
| 1 | PP-1 | 1 | None | 0 | 7.7 | 4.9 | 58 | 1.4 |
| 2 | PP-1 | 1 | None | 0 | 8.3 | 6.8 | 58 | 0.9 |
| 3 | PP-1 | 1 | None | 0 | 8.3 | 4.9 | 54 | 1.1 |
| 4 | PP-4 | 1 | None | 0 | 8 | 5.4 | 60 | 1.0 |
| 5 | PP-1 | 1 | None | 0 | 7.5 | 5.6 | 57 | 0.8 |
| 6 | PP-1 | 1 | 1 | 1 | 7.6 | 5.1 | 61 | 1.3 |
| 7 | PP-4 | 1 | 1 | 1 | 7.7 | 6 | 59 | 1.1 |
| 8 | PP-1 | 1 | 1 | 0.5 | 7.6 | 6 | 57 | 1.1 |
| 9 | PP-3 | 1 | 1 | 1 | 8.5 | 4.9 | 58 | 1.3 |
| 10 | PP-1 | 1 | 2 | 1 | 8 | 5.8 | 58 | 1.1 |
| 11 | PP-4 | 1 | 2 | 1 | 8.1 | 6.1 | 61 | 1.1 |
| 12 | PP-3 | 1 | 2 | 1 | 8 | 4.9 | 58 | 1.3 |
| 13 | PP-1 | 1 | 3 | 1 | 7.7 | 4.6 | 57 | 1.4 |
| 14 | PP-1 | 1 | 7 | 1 | 9.4 | 6.4 | 59 | 1.0 |
| 15 | PP-1 | 1 | 8 | 1 | 8.5 | 6 | 58 | 1.1 |
| 16 | PP-1 | 1 | 8 | 1 | 7.8 | 7 | 53 | 0.8 |
| 17 | PP-3 | 1 | None | 0 | 7.4 | 6.1 | 67 | 1.2 |
| 18 | PP-1 | 1 | 6 | 0.5 | 8.3 | 6.7 | 58 | 1.0 |
| 19 | PP-1 | 1 | 6 | 0.75 | 7.7 | 5.6 | 52 | 1.0 |
| 20 | PP-1 | 1 | 5 | 1 | 7.6 | 4.8 | 57 | 1.3 |
| 21 | PP-1 | 1 | 5 | 0.5 | 7.6 | 5.5 | 58 | 1.2 |
| 22 | PP-1 | 1 | 5 | 1 | 9.8 | 5.2 | 52 | 1.1 |
| 23 | PP-1 | 1 | 5 | 0.5 | 8.4 | 5.4 | 59 | 1.2 |
| 24 | PP-1 | 1 | 5 | 1 | 8.7 | 6.2 | 56 | 1.0 |
| 25 | PP-1 | 1 | 5 | 1 | 7.9 | 6.5 | 59 | 1.0 |
| 26 | PP-1 | 1 | 5 | 1 | 8.3 | 5.3 | 63 | 1.3 |
| 27 | PP-1 | 1 | 4 | 1 | 6.8 | 5 | 54 | 1.2 |
| 28 | PP-1 | 1 | 9 | 0.1 | 9.1 | 5.8 | 55 | 1.0 |
| 29 | PP-1 | 1 | 9 | 0.5 | 9.1 | 5.9 | 54 | 1.0 |
| 30 | PP-1 | 1 | 9 | 0.5 | 9.1 | 5.8 | 55 | 1.1 |
| 31 | PP-1 | 1 | 10 | 0.5 | 7.9 | 5.4 | 56 | 1.1 |
| 32 | PP-1 | 1 | 11 | 0.5 | 8.6 | 6.6 | 57 | 1.1 |
| 33 | PP-1 | 1 | 12 | 0.5 | 8.5 | 5.5 | 55 | 1.1 |
| 34 | PP-1 | 1 | 13 | 1 | 8.3 | 5.9 | 61 | 1.1 |
| 35 | PP-1 | 1 | 15 | 0.75 | 10.2 | 6.9 | 60 | 1.0 |
| 36 | PP-1 | 1 | 14 | 0.25 | 6.9 | 4.3 | 59 | 1.5 |
| 37 | PP-1 | 1 | 5 & 10 | 0.75/0.2 | 8 | 5.3 | 57 | 1.2 |
| 38 | PP-1 | 1 | 1 & 7 | 0.5/0.4 | 8 | 5.5 | 57 | 1.1 |
| 39 | PP-1 | 1 | 1 & 8 | 0.5/0.2 | 8.5 | 5.5 | 57 | 1.1 |

TABLE 3-continued

BMF Web Characteristics

| BMF Web Number | Resin Grade | BMF Extrusion Method | Charging Additive | Charging Additive Concn. (wt %) | Effective Fiber Diam. (mm) | Solidity (%) | Basis Weight (g/m$^2$) | Thickness (mm) |
|---|---|---|---|---|---|---|---|---|
| 40 | PP-4 | 1 | 1 | 1 | 8 | 7.1 | 51 | 0.8 |
| 41 | PP-4 | 1 | 1 | 1 | 14.8 | 6.9 | 50 | 0.8 |
| 42 | PP-4 | 2 | 1 | 1 | 7.4 | 8 | 50 | 0.7 |
| 43 | PP-4 | 2 | 1 | 1 | 15 | 7.2 | 50 | 0.8 |
| 44 | PP-4 | 2 | 1 | 1 | 15.3 | 7.2 | 151 | 2.3 |
| 45 | PP-2 (99.25 wt %) + PMP 0.75 wt %) | 2 | 6 & 9 | 0.5/0.2 | 12.9 | 5.5 | 64 | 1.3 |
| 46 | PP-4 | 2 | 5 | 0.8 | 15 | 7 | 50 | 0.8 |
| 47 | PE | 1 | 5 | 1 | 10.9 | 10.5 | 59 | 0.6 |
| 48 | PMP | 1 | None | 0 | 7.7 | 6.5 | 49 | 0.9 |
| 49 | PMP | 1 | 1 | 1 | 7.1 | 7.8 | 48 | 0.8 |
| 50 | PMP | 1 | 5 | 1 | 10.1 | 6 | 46 | 0.9 |
| 51 | PLA | 1 | 1 | 1 | 7.8 | 8.8 | 50 | 0.46 |
| 52 | PP-2 (95 wt %) + COC (5 wt %) | 1 | None | 0 | 13.8 | 7.9 | 98 | 1.36 |

Step B—Electret Preparation:

Samples of each BMF web prepared in Step A above were charged by one of three electret charging methods: hydrocharging, corona pre-treatment and hydrocharging, or plasma fluorination pre-treatment and hydrocharging. Table 5 summarizes the specific charging method applied to each of the samples.

Charging Method 1—Hydrocharging:

Hydrocharging Fluid Preparation: Starting with water that was purified by reverse osmosis and deionization, the compounds listed in Table 4 were used to make various aqueous hydrocharging fluids with the quoted concentrations in parts per million by weight (PPM) listed for each Example and Comparative Example in Table 5. The following procedure describes the preparation of three $Na_2CO_3$ aqueous solutions (50 PPM, 100 PPM 1000 PPM) in deionized (DI) water. Other solutions were made using the same procedure.

a) 1000 PPM $Na_2CO_3$ Solution: Using an analytical balance, 3.6 g of $Na_2CO_3$ was dissolved in 3596.4 g of DI water to make a 0.1 weight % solution (1000 PPM).

b) 100 PPM $Na_2CO_3$ Solution: Using an analytical balance, 360 g of the 1000 PPM $Na_2CO_3$ solution was dissolved in 3240 g of DI water to make a 0.01 weight % solution (100 PPM).

c) 50 PPM $Na_2CO_3$ Solution: Using an analytical balance, 1800 g of the 100 PPM $Na_2CO_3$ solution was dissolved in 1800 g of DI water to make a 0.005 weight % solution (50 PPM).

TABLE 4

Compounds added to the Aqueous Hydrocharging Liquid

| Chemical Name | Formula | Manufacturer |
|---|---|---|
| Acetic Acid | $CH_3COOH$ | EMD Chemicals Inc., Gibbstown, NJ |
| Acetone | $CH_3COCH_3$ | VWR International, West Chester, PA |
| Ammonium Chloride | $NH_4Cl$ | EMD Chemicals Inc., Gibbstown, NJ |
| Ammonium Hydroxide (28-30% ammonia in water) | $NH_4OH$ | EMD Chemical Inc., Gibbstown, NJ |
| Copper chloride | $CuCl_2$ | Alfa Aesar Company Ward Hill, MA |
| Dodecylbenzene sodium sulfonate | $C_{18}H_{29}NaO_3S$ | VWR International, West Chester, PA |
| Ethanol | $CH_3CH_2OH$ | VWR International, West Chester, PA |
| Hydrochloric Acid (36.5-38% in water) | HCl | EMD Chemicals Inc., Gibbstown, NJ |
| Potassium Carbonate | $K_2CO_3$ | EMD Chemicals Inc., Gibbstown, NJ |
| Potassium Hydroxide | KOH | EMD Chemicals Inc., Gibbstown, NJ |
| Sodium Acetate | $CH_3COONa$ | Thermo Fisher Scientific, Waltham, MA |
| Sodium Bicarbonate | $NaHCO_3$ | EMD Chemicals Inc., Gibbstown, NJ |
| Sodium Carbonate | $Na_2CO_3$ | Sigma-Aldrich |
| Sodium Chloride | NaCl | Sigma-Aldrich |
| Sodium Hydroxide | NaOH | EMD Chemicals Inc., Gibbstown, NJ |

The conductivity and pH of each hydrocharging liquid used for each Example or Comparative Example were measured as described above and the results are listed in Table 5 below.

Hydrocharging Procedure:

The BMF webs were hydrocharged using the desired charging liquid according to the technique taught in U.S. Pat. No. 5,496,507 (Angadjivand et al.). A fine spray of the hydrocharging liquid was continuously generated from a nozzle that was connected to one stainless storage tank pressurized to 655 kiloPascals (95 psig) and a flow rate of approximately 1.4 liters/minute. The selected BMF webs prepared in Step A were conveyed by a porous belt through the water spray at a speed of approximately 10 centimeters/second while a vacuum simultaneously drew the hydrocharging liquid through the web from below. Each BMF web was run through the hydrocharger twice (sequentially once on each side) and then allowed to air dry completely overnight before filter testing.

Charging Method 2—Corona Pre-Treatment and Hydrocharging:

The selected BMF webs prepared in Step A above were pre-treated by a DC corona discharge. The corona pre-treatment was accomplished by passing the BMF web on a grounded surface under a corona brush source with a corona current of about 0.01 milliamp per centimeter of discharge source length at a rate of about 3 centimeters per second. The corona source was about 3.5 centimeters above the grounded surface on which the web was carried. The corona source was driven by a positive DC voltage. Following the corona treatment, the BMF web was charged by hydrocharging using the desired charging liquid as described in Charging Method 1.

Charging Method 3—Plasma Fluorination Pre-Treatment and Hydrocharging:

The selected BMF webs prepared in Step A above were pre-treated by plasma fluorination using the procedure described in "General Web Making, Plasma Treatment, and Electret Charging Procedures" in U.S. Pat. No. 7,244,292 to Kirk et al., entitled Electret Article Having Heteroatoms And Low Fluorosaturation Ratio using perfluoropropane ($C_3F_8$) gas available from 3M Company, St. Paul, Minn. Following the plasma pre-treatment, the BMF web was charged by hydrocharging using the desired charging liquid as described above in Charging Method 1.

Zeta Potential and QF

For representative BMF samples prepared in Step A, zeta potentials were measured using the method described above. The average of the zeta potential measured during the conductivity scan from between 1000 to 2000 microS/cm was determined and is reported in Table 5, and for several cases this value was an average of multiple tests performed on the same BMF sample material.

Each of the charged samples prepared in Step B above was cut into two 1 meter sections. One section was tested in its initial state for % DOP aerosol penetration (% Pen) and pressure drop, and the quality factor (QF) was calculated as described in the Test Methods given above. For some samples, the second section was used to measure the zeta potential. These results are reported in Table 5 below as % Pen, Pressure Drop, and QF.

Examples 1-60 and Comparative Examples C 1-C 60

Comparative Examples 1a, 1b, & Example 1

For a BMF web made of polypropylene (BMF-1) containing no charging additive, the zeta potential was measured to be −9.3 mV. By using Charging Method-1 (hydrocharging only) with 50 PPM of $Na_2CO_3$ (pH 10.6) the quality factor of Ex. 1 (0.33) was greater than that of Comp. Ex. 1a (0.27) charged with DI water (pH 7.5) alone or Comp. Ex. 1b (0.24) charged with 50 PPM of $CH_3COOH$ (pH 4.2).

Comparative Examples 2a, 2b, & Example 2

For a BMF web made of polypropylene (BMF-2) containing no charging additive, the zeta potential after a corona pre-treatment was measured to be −10.8 mV. By using Charging Method-2 (corona pre-treatment then hydrocharging) with 50 PPM of $Na_2CO_3$ (pH 10.6) the quality factor of Ex. 2 (1.04) was greater than that of Comp. Ex. 2a (0.78) charged with DI water (pH 8.1) alone or Comp. Ex. 2b (0.65) charged with 50 PPM of $CH_3COOH$ (pH 4.3).

Comparative Example 3a, & Examples 3a, 3b

For a BMF web made of polypropylene (BMF-6) containing 1 wt % of Charge Additive-1, the zeta potential was measured to be −10.2 mV. By using Charging Method-1 (hydrocharging only) the quality factors of Ex. 3a (1.02) charged with water alone (pH 7.5) and Ex. 3b (1.41) charged with 50 PPM of $Na_2CO_3$ (pH 10.1) were greater than that of Comp. Ex. 3 (0.30) charged with 50 PPM of $CH_3COOH$ (pH 4.4).

Comparative Examples 4a, 4b, & Example 4

For a BMF web made of polypropylene (BMF-6) containing 1 wt % of Charge Additive-1, the zeta potential after a corona pre-treatment was measured to be −10.8 mV. By using Charging Method-2 (corona pre-treatment then hydrocharging) with 50 PPM of $Na_2CO_3$ (pH 10.4) the quality factor of Ex. 4 (1.59) was greater than that of Comp. Ex. 4a (1.24) charged with DI water (pH 8.1) alone or Comp. Ex. 4b (0.47) charged with 50 PPM of $CH_3COOH$ (pH 4.2).

Comparative Examples 5a, 5b, & Example 5

For a BMF web made of polypropylene (BMF-6) containing 1 wt % of Charge Additive-1, the zeta potential was measured to be −10.2 mV. By using Charging Method-1 (hydrocharging only) with a solution containing an organic solvent (10 wt % acetone in DI water), with 50 PPM of $Na_2CO_3$ (pH 10.7) the quality factor of Ex. 5 (1.41) was greater than that of Comp. Ex. 5a (1.15) charged with the 10 wt % acetone in DI water (pH 9.7) alone or Comp. Ex. 5b (0.20) charged with 50 PPM of $CH_3COOH$ (pH 5.0).

Comparative Examples 6a, 6b, & Example 6

For a BMF web made of polypropylene (BMF-10) containing 1 wt % of Charge Additive-2, the zeta potential after a corona pre-treatment was measured to be −10.7 mV. By using Charging Method-2 (corona pre-treatment then hydrocharging) with 50 PPM of $Na_2CO_3$ (pH 10.4) the quality factor of Ex. 6 (1.61) was greater than that of Comp. Ex. 6a (1.28) charged with DI water (pH 8.2) alone or Comp. Ex. 6b (0.46) charged with 50 PPM of $CH_3COOH$ (pH 4.2).

Comparative Example 7a, 7b & Examples 7a, 7b, 7c

For a BMF web made of polypropylene (BMF-10) containing 1 wt % of Charge Additive-2, the zeta potential was measured to be −10.9 mV. By using Charging Method-1 (hydrocharging only) with 50 PPM of $Na_2CO_3$ (pH 10.5, conductivity 139 microS/cm) the quality factor of Ex. 7a (1.62) was greater than that of Comp. Ex. 7 (1.06) charged with DI water (pH 7.2) alone. By adding increasing amounts of the neutral salt NaCl to the basic 50 PPM $Na_2CO_3$ hydrocharging solution of Ex. 7a, the pH is very slightly decreased, but the conductivity increases significantly, and the QFs of Ex. 7b (50 PPM $Na_2CO_3$, 50 PPM NaCl, pH 10.3, conductivity 230.4 microS/cm, QF 1.45), Ex. 7c (50 PPM $Na_2CO_3$, 500 PPM NaCl, pH 10.3, conductivity 1150 microS/cm, QF 1.25), and Comp. Ex. 7b (50 PPM $Na_2CO_3$, 5000 PPM NaCl, pH 10.3, conductivity 9340 microS/cm, QF 0.75) decrease in comparison to Ex 7a.

Comparative Examples 8a, 8b, & Example 8

For a BMF web made of polypropylene (BMF-14) containing 1 wt % of Charge Additive-7, the zeta potential after a corona pre-treatment was measured to be −8.4 mV. By using Charging Method-2 (corona pre-treatment then hydrocharging) with 50 PPM of $Na_2CO_3$ (pH 10.4) the quality factor of Ex. 8 (1.75) was greater than that of Comp. Ex. 8a (1.15) charged with DI water (pH 8.2) alone or Comp. Ex. 8b (0.70) charged with 50 PPM of $CH_3COOH$ (pH 4.2).

Comparative Examples 9a, 9b, 9c & Examples 9a, 9b, 9c

For a BMF web made of polypropylene (BMF-14) containing 1 wt % of Charge Additive-7, the zeta potential was measured to be −11.8 mV. By using Charging Method-1 (hydrocharging only) with 50 PPM of $Na_2CO_3$ (pH 10.4, conductivity 136.4 microS/cm) the quality factor of Ex. 9a (1.85) was greater than that of Comp. Ex. 9a (1.14) charged with DI water (pH 8.2) alone or Comp. Ex. 9c (0.48) charged with 50 PPM of $CH_3COOH$ (pH 4.2). By adding increasing amounts of the neutral salt NaCl to the basic 50 PPM $Na_2CO_3$ hydrocharging solution of Ex. 9a, the pH is very slightly decreased, but the conductivity increases significantly, and the QFs of Ex. 9b (50 PPM $Na_2CO_3$, 50 PPM NaCl, pH 10.3, conductivity 230.4 microS/cm, QF 1.53), Ex. 9c (50 PPM $Na_2CO_3$, 500 PPM NaCl, pH 10.3, conductivity 1150 microS/cm, QF 1.33), and Comp. Ex. 9c (50 PPM $Na_2CO_3$, 5000 PPM NaCl, pH 10.3, conductivity 9340 microS/cm, QF 0.90) decrease in comparison to Ex. 9a.

Comparative Examples 10a, 10b, & Example 10

For a BMF web made of polypropylene (BMF-15) containing 1 wt % of Charge Additive-8, the zeta potential was measured to be −10.4 mV. By using Charging Method-1 (hydrocharging only) with 50 PPM of $Na_2CO_3$ (pH 10.5) the quality factor of Ex. 10 (1.46) was greater than that of Comp. Ex. 10a (1.08) charged with DI water (pH 7.2) alone or Comp. Ex. 10b (0.66) charged with 50 PPM of $CH_3COOH$ (pH 4.1).

Comparative Examples 11a, 11b, & Example 11

For a BMF web made of polypropylene (BMF-16) containing 1 wt % of Charge Additive-8, the zeta potential after a corona pre-treatment was measured to be −9.6 mV. By using Charging Method-2 (corona pre-treatment then hydrocharging) with 50 PPM of $Na_2CO_3$ (pH 10.5) the quality factor of Ex. 11 (2.05) was greater than that of Comp. Ex. 11a (1.63) charged with DI water (pH 8.1) alone or Comp. Ex. 10b (1.72) charged with 50 PPM of $CH_3COOH$ (pH 4.3).

Comparative Examples 12a, 12b, & Examples 12a, 12b

For a BMF web made of polypropylene (BMF-17) containing no charging additive, the zeta potential after a plasma fluorination pre-treatment was measured to be −24.1 mV. By using Charging Method-3 (plasma fluorination pre-treatment then hydrocharging) both Ex. 12a (QF 2.35) with 50 PPM of $Na_2CO_3$ (pH 10.4) and Ex. 12b (QF 2.38) with 50 PPM of $NH_4OH$ (pH 10.6) had quality factors greater than Comp. Ex. 12a (2.18) charged with DI water (pH 8.2) alone or Comp. Ex. 12b (1.96) charged with 50 PPM of $CH_3COOH$ (pH 4.2).

Comparative Examples 13a, 13b, & Example 13

For a BMF web made of polypropylene (BMF-19) containing 0.75 wt % of Charge Additive-6, the zeta potential was measured to be 3.8 mV. By using Charging Method-1 (hydrocharging only) with 50 PPM of $CH_3COOH$ (pH 4.2) the quality factor of Ex. 13 (2.40) was greater than that of Comp. Ex. 13a (2.35) charged with DI water (pH 8.2) alone or Comp. Ex. 13b (1.21) charged with 50 PPM of $Na_2CO_3$ (pH 10.4).

Comparative Examples 14a, 14b, & Example 14

For a BMF web made of polypropylene (BMF-18) containing 0.5 wt % of Charge Additive-6, the zeta potential after a corona pre-treatment was measured to be 0.5 mV. By using Charging Method-2 (corona pre-treatment then hydrocharging) with 50 PPM of $CH_3COOH$ (pH 4.2) the quality factor of Ex. 14 (2.32) was greater than that of Comp. Ex. 14a (1.88) charged with DI water (pH 8.2) alone or Comp. Ex. 14b (1.68) charged with 50 PPM of $Na_2CO_3$ (pH 10.4).

Comparative Examples 15a, 15b, & Example 15

For a BMF web made of polypropylene (BMF-20) containing 1 wt % of Charge Additive-5, the zeta potential was measured to be −1.9 mV. By using Charging Method-1 (hydrocharging only) with 50 PPM of $CH_3COOH$ (pH 4.4) the quality factor of Ex. 15 (2.85) was greater than that of Comp. Ex. 15a (2.18) charged with DI water (pH 7.5) alone or Comp. Ex. 15b (1.55) charged with 50 PPM of $Na_2CO_3$ (pH 10.1).

Comparative Examples 16a, 16b, & Example 16

For a BMF web made of polypropylene (BMF-21) containing 0.5 wt % of Charge Additive-5, the zeta potential after a corona pre-treatment was measured to be −3.3 mV. By using Charging Method-2 (corona pre-treatment then hydrocharging) with 50 PPM of $CH_3COOH$ (pH 4.2) the quality factor of Ex. 16 (2.34) was greater than that of Comp. Ex. 16a (1.59) charged with DI water (pH 8.2) alone or Comp. Ex. 16b (1.43) charged with 50 PPM of $Na_2CO_3$ (pH 10.4).

Comparative Examples 17a, 17b, & Example 17

For a BMF web made of polypropylene (BMF-31) containing 0.5 wt % of Charge Additive-5, the zeta potential was measured to be −6 mV. By using Charging Method-1 (hydrocharging only) with 50 PPM of $CH_3COOH$ (pH 4.2) the quality factor of Ex. 17 (1.68) was greater than that of Comp. Ex. 17a (0.5) charged with DI water (pH 8.2) alone or Comp. Ex. 17b (0.35) charged with 50 PPM of $Na_2CO_3$ (pH 10.4).

Comparative Examples 18a, 18b, & Example 18

For a BMF web made of polypropylene (BMF-35) containing 0.75 wt % of Charge Additive-15, the zeta potential was measured to be −1.0 mV. By using Charging Method-1 (hydrocharging only) with 50 PPM of $CH_3COOH$ (pH 4.2) the quality factor of Ex. 18 (2.64) was greater than that of Comp. Ex. 18a (2.22) charged with DI water (pH 8.2) alone or Comp. Ex. 18b (1.42) charged with 50 PPM of $Na_2CO_3$ (pH 10.4).

Comparative Examples 19a, 19b, & Example 19

For a BMF web made of polypropylene (BMF-37) containing 0.75 wt % of Charge Additive-5 and 0.2 wt % of Charge Additive-10, the zeta potential was measured to be 0.6 mV. By using Charging Method-1 (hydrocharging only) with 50 PPM of $CH_3COOH$ (pH 4.2) the quality factor of Ex. 19 (3.04) was greater than that of Comp. Ex. 19a (2.35) charged with DI water (pH 8.2) alone or Comp. Ex. 19b (0.99) charged with 50 PPM of $Na_2CO_3$ (pH 10.4).

Comparative Examples 20a, 20b, & Example 20

For a BMF web made of polyethylene (BMF-47) containing 1 wt % of Charge Additive-5, the zeta potential was measured to be 2.7 mV. By using Charging Method-1 (hydrocharging only) with 50 PPM of $CH_3COOH$ (pH 4.3) the quality factor of Ex. 20 (1.70) was greater than that of Comp. Ex. 20a (1.28) charged with DI water (pH 8.1) alone or Comp. Ex. 20b (0.92) charged with 50 PPM of $Na_2CO_3$ (pH 10.5).

Comparative Examples 21a, 21b, & Example 21

For a BMF web made of poly(4-methyl-1-pentene) (BMF-48) containing no charge additive, the zeta potential was measured to be −9.9 mV. By using Charging Method-1 (hydrocharging only) with 50 PPM of $Na_2CO_3$ (pH 10.8) the quality factor of Ex. 21 (1.72) was greater than that of Comp. Ex. 21a (0.41) charged with DI water (pH 5.9) alone or Comp. Ex. 21b (0.52) charged with 50 PPM of $CH_3COOH$ (pH 4.6).

Comparative Example 22 & Examples 22a, 22b

For a BMF web made of poly(4-methyl-1-pentene) (BMF-48) containing no charge additive, the zeta potential was measured to be −9.9 mV. By using Charging Method-1 (hydrocharging only) the quality factors of Ex. 22a (0.33) with 10 PPM of $Na_2CO_3$ (pH 8.2) and of Ex. 22b (0.40) with 100 PPM of $Na_2CO_3$ (pH 9.7) were both greater than that of Comp. Ex. 22 (0.19) charged with DI water (pH 6.0) alone.

Comparative Examples 23a, 23b, & Example 23

For a BMF web made of poly(4-methyl-1-pentene (BMF-49) containing 1 wt % of Charge Additive-1, the zeta potential was measured to be −8.3 mV. By using Charging Method-1 (hydrocharging only) with 50 PPM of $Na_2CO_3$ (pH 10.8) the quality factor of Ex. 23 (1.39) was greater than that of Comp. Ex. 23a (0.41) charged with DI water (pH 5.9) alone or Comp. Ex. 23b (0.33) charged with 50 PPM of $CH_3COOH$ (pH 4.6).

Comparative Example 24 & Examples 24a, 24b

For a BMF web made of poly(4-methyl-1-pentene) (BMF-49) containing 1 wt % of Charge Additive-1, the zeta potential was measured to be −8.3 mV. By using Charging Method-1 (hydrocharging only) the quality factors of Ex. 24a (0.72) with 10 PPM of $Na_2CO_3$ (pH 8.2) and of Ex. 24b (0.91) with 100 PPM of $Na_2CO_3$ (pH 9.7) were both greater than that of Comp. Ex. 24 (0.54) charged with DI water (pH 6.0) alone.

Comparative Example 25 & Examples 25a, 25b

For a BMF web made of poly(4-methyl-1-pentene) (BMF-50) containing 1 wt % of Charge Additive-5, the zeta potential was measured to be −4.8 mV. By using Charging Method-1 (hydrocharging only) the quality factors when charging with DI water (pH 5.9) alone Ex. 25a (1.18) or with 50 PPM of $CH_3COOH$ (pH 4.6) Ex. 25 (1.78) were both greater than that of Comp. Ex. 25 charged with 100 PPM of $Na_2CO_3$ (pH 9.7).

Comparative Examples 26a, 26b & Examples 26a, 26b, 26c

For a BMF web made of polypropylene (BMF-3) containing no charging additive (substantially equivalent to that used in Ex. 1), by using Charging Method-1 (hydrocharging only) with 50 PPM of $K_2CO_3$ (pH 7.7, conductivity 120 microS/cm) the quality factor of Ex. 26a (0.73) was greater than that of Comp. Ex. 26a (0.45) charged with DI water (pH 6.5) alone. With an increasing amount of $K_2CO_3$ in the hydrocharging solution for Ex. 26b (500 PPM, pH 10, conductivity 1000 microS/cm, QF 0.78), the QF increases. With further increase in the amount of $K_2CO_3$ in the hydrocharging solution for Ex. 26c (5000 PPM, pH 11, conductivity 5000 microS/cm, QF 0.68) and Comp. Ex. 26b (15000 PPM, pH 11.8, conductivity 22,000 microS/cm, QF 0.58) the pH and conductivity both increase, but the QF tends to decrease with respect to Ex. 26a.

Comparative Examples 27a, 27b, 27c & Examples 27a, 27b, 27c, 27d, 27e, 27f

This set of examples demonstrates that for a BMF web made of polypropylene (BMF-3) containing no charging additive (substantially equivalent to that used in Ex. 1), by using Charging Method-2 (corona pre-treatment and hydrocharging) with 50 PPM of $Na_2CO_3$ (pH 7.7, conductivity 123.6 microS/cm) the quality factor of Ex. 27a (1.51) was greater than that of Comp. Ex. 27a (0.84) charged with DI water (pH 6.8) alone. Likewise, for Ex. 27b (5 PPM $NH_4OH$, pH 7.1, conductivity 24 microS/cm, QF 1.29), Ex. 27c (50 PPM $NH_4OH$, pH 8.5, conductivity 64 microS/cm, QF 1.26), Ex. 27d (50 PPM $NaHCO_3$, pH 8.5, conductivity 56.7 microS/cm, QF 1.22), Ex. 27e (50 PPM $CH_3COONa$, pH 7.1, conductivity 42 microS/cm, QF 1.09), Ex. 27f (50 PPM KOH, pH 8.3, conductivity 212 microS/cm, QF 1.34), the QFs are greater than that of Comp. Ex. 27a in addition to Comp. Ex. 27b, (15000 PPM KOH, pH 13, conductivity 68,000 microS/cm, QF 1.07), and Comp. Ex. 27c (500 PPM $CuCl_2$, pH 4.7, conductivity 721 microS/cm, QF 0.55).

Comparative Examples 28a, 28b & Examples 28a, 28b

This set of examples demonstrates that for a BMF web made of polypropylene (BMF-4) containing no charging additive (substantially equivalent to that used in Ex. 1), by using Charging Method-1 (hydrocharging only) with 10 PPM of NaOH (pH 7.1, conductivity 23.3 microS/cm) the quality factor of Ex. 28a (0.80) was greater than that of Comp. Ex. 28 (0.22) charged with DI water (pH 6.8) alone. With an increasing amount of NaOH in the hydrocharging solution for Ex. 28b (100 PPM, pH 9, conductivity 325 microS/cm, QF 1.01), the QF increases. With further increase in the amount of NaOH in the hydrocharging solution for Comp. Ex. 28b (5000 PPM, pH 13, conductivity 26,000 microS/cm, QF 0.71), the pH and conductivity both increase, but the QF tends to decrease with respect to Ex. 28a.

Comparative Examples 29a, 29b & Examples 29a, 29b, 29c

This set of examples demonstrates that for a BMF web made of polypropylene (BMF-4) containing no charging additive (substantially equivalent to that used in Ex. 1), by using Charging Method-2 (corona pre-treatment and hydrocharging) with 50 PPM of $K_2CO_3$ (pH 7.7, conductivity 120 microS/cm) the quality factor of Ex. 29a (1.46) was greater than that of Comp. Ex. 29a (0.97) charged with DI water (pH 6.5) alone. Likewise, for Ex. 29b (50 PPM KOH, pH 8.3, conductivity 212 microS/cm, QF 1.19), Ex. 29c (50 PPM NaOH, pH 8.5, conductivity 246 microS/cm, QF 1.32) the QFs are greater than that of Comp. Ex. 29a and Comp. Ex. 29b (5,000 PPM NaOH, pH 12.8, conductivity 27,400 microS/cm, QF 1.12).

Comparative Examples 30a, 30b, 30c, 30d, 30e

This set of examples demonstrates that for a BMF web made of polypropylene (BMF-3) containing no charging additive (substantially equivalent to that used in Ex. 1), by using Charging Method-2 (corona pre-treatment and hydrocharging) with DI water (pH 6.8) the QF of Comp. Ex. 30a (1.66) was greater than that of Comp. Ex. 30b (10 PPM of $NH_4Cl$, pH 6.8, conductivity 28.2 microS/cm, QF 1.61), Comp. Ex. 30c (100 PPM of $NH_4Cl$, pH 5.8, conductivity 273 microS/cm, QF 1.39), Comp. Ex. 30d (1,000 PPM of $NH_4Cl$, pH 5.5, conductivity 2580 microS/cm, QF 1.28), and Comp. Ex. 30e (5,000 PPM of $NH_4Cl$, pH 5.3, conductivity 11,800 microS/cm, QF 1.01).

Comparative Examples 31a, 31b & Examples 31a, 31b

This set of examples demonstrates that for a BMF web made of polypropylene (BMF-5) containing no charging additive (substantially equivalent to that used in Ex. 1), by using Charging Method-1 (hydrocharging only) with 10 PPM of a surfactant dodecylbenzene sodium sulfonate both Ex. 31a (10 PPM dodecylbenzene sodium sulfonate, pH 7.9, QF 0.32) and Ex. 31b (10 PPM dodecylbenzene sodium sulfonate and 100 PPM of $Na_2CO_3$, pH 10.2, QF 0.53) had QFs greater than that of Comp. Ex. 31a (0.23) charged with DI water (pH 7.7) alone and of Comp. Ex. 31b (10 PPM dodecylbenzene sodium sulfonate and 100 PPM HCl, pH 2.6, QF 0.16).

Comparative Examples 32a, 32b & Examples 32a, 32b

This set of examples demonstrates that for a BMF web made of polypropylene (BMF-7) containing 1 wt % Charging Additive-1 (substantially equivalent to that used in Ex. 3), by using Charging Method-1 (hydrocharging only) with 1 PPM of NaOH (pH 9.6, conductivity 5.19 microS/cm) the QF of Ex. 32a (1.19) was greater than that of Comp. Ex. 32a (0.93) charged with DI water (pH 6.3) alone. With an increasing amount of NaOH in the hydrocharging solution for Ex. 32b (10 PPM, pH 10.8, conductivity 61.7 microS/cm, QF 1.48), the QF increases. With further increase in the amount of NaOH in the hydrocharging solution for Comp. Ex. 32b (5,000 PPM, pH 13, conductivity 26,000 microS/cm, QF 0.88), the pH and conductivity both increase, but the QF tends to decrease with respect to Ex. 32a.

Comparative Example 33 & Examples 33a, 33b

This set of examples demonstrates that for a BMF web made of polypropylene (BMF-8) containing 0.5 wt % Charging Additive-1, by using Charging Method-1 (hydrocharging only) with 20 PPM of NaOH (pH 11) the QF of Ex. 33a (1.40) was greater than that of Comp. Ex. 33 (1.05) charged with DI water (pH 7.5) alone. Hydrocharging the web (BMF-8) a second time with the same 20 PPM NaOH solution (pH 11), further increases the QF of Ex 33b (1.62).

Comparative Examples 34a, 34b, 34c, 34d, 34e, 34f

This set of examples demonstrates that for a BMF web made of polypropylene (BMF-7) containing 1 wt % Charging Additive-1 (substantially equivalent to that used in Ex. 3), by using Charging Method-1 (hydrocharging only) with DI water (pH 6.8) the QF of Comp. Ex. 34a (1.32) was greater than that of Comp. Ex. 34b (1 PPM of $NH_4Cl$, pH 6.8, conductivity 3.7 microS/cm, QF 1.30), Comp. Ex. 34c (10 PPM of $NH_4Cl$, pH 6.8, conductivity 28.2 microS/cm, QF 1.25), Comp. Ex. 34d (100 PPM of $NH_4Cl$, pH 5.8, conductivity 273 microS/cm, QF 1.12), Comp. Ex. 34e (1,000 PPM of $NH_4Cl$, pH 5.5, conductivity 2,580 microS/cm, QF 0.85), and Comp. Ex. 34f (5,000 PPM of $NH_4Cl$, pH 5.3, conductivity 11,800 microS/cm, QF 0.55).

Comparative Example 35 & Examples 35a, 35b, 35c

This set of examples demonstrates that for a BMF web made of polypropylene (BMF-9) containing 1 wt % Charging Additive-1 (substantially equivalent to that used in Ex. 4), by using Charging Method-2 (corona pre-treatment and hydrocharging) with 1 PPM of NaOH (pH 9.6, conductivity 5.19 microS/cm) the QF of Ex. 35a (1.91) was greater than that of Comp. Ex. 35 (1.62) charged with DI water (pH 6.3) alone. With an increasing amount of NaOH in the hydrocharging solution for Ex. 35b (10 PPM, pH 10.8, conductivity 61.7 microS/cm, QF 1.85) and for Ex. 35c (1,000 PPM, pH 12.4, conductivity 5,820 microS/cm, QF 1.62), the pH and conductivity both increase, but the QF tends to decrease with respect to Ex. 35a.

Comparative Examples 36a, 36b & Examples 36a, 36b

This set of examples demonstrates that for a BMF web made of polypropylene (BMF-11) containing 1 wt % Charging Additive-1 (similar to that used in Ex. 4), by using Charging Method-1 (hydrocharging only) with 1 PPM of NaOH (pH 9.6, conductivity 5.19 microS/cm) the QF of Ex. 36a (1.10) was greater than that of Comp. Ex. 36a (0.77) charged with DI water (pH 6.3) alone. With an increasing amount of NaOH in the hydrocharging solution for Ex. 36b (10 PPM, pH 10.8, conductivity 61.7 microS/cm, QF 1.38), the QF increases. With further increase in the amount of NaOH in the hydrocharging solution for Comp. Ex. 36b (5,000 PPM, pH 13, conductivity 26,000 microS/cm, QF 0.85), the pH and conductivity both increase, but the QF tends to decrease with respect to Ex. 36a.

Comparative Example 37 & Examples 37a, 37b, 37c

This set of examples demonstrates that for a BMF web made of polypropylene (BMF-12) containing 1 wt % Charging Additive-2 (similar to that used in Ex. 6), by using Charging Method-2 (corona pre-treatment and hydrocharging) with 1 PPM of NaOH (pH 9.6, conductivity 5.19 microS/cm) the QF of Ex. 37a (1.96) was greater than that of Comp. Ex. 37 (1.52) charged with DI water (pH 6.3) alone. With an increasing amount of NaOH in the hydrocharging solution for Ex. 37b (10 PPM, pH 10.8, conductivity 61.7 microS/cm, QF 1.99) the QF increases. With further increase in the amount of NaOH in the hydrocharging solution for Ex. 37c (1,000 PPM, pH 12.4, conductivity 5,820 microS/cm, QF 1.61), the pH and conductivity both increase, but the QF tends to decrease with respect to Ex. 37a but is still greater than Comp. Ex. 37.

Comparative Examples 38a, 38b, & Example 38

This set of examples demonstrates that for a BMF web made of polypropylene (BMF-13) containing 1 wt % of Charge Additive-3, by using Charging Method-1 (hydrocharging only) with 50 PPM of $Na_2CO_3$ (pH 10.4) the quality factor of Ex. 38 (1.68) was greater than that of Comp. Ex. 38a (1.38) charged with DI water (pH 8.2) alone or Comp. Ex. 38b (0.58) charged with 50 PPM of $CH_3COOH$ (pH 4.2).

Comparative Examples 39a, 39b, & Example 39

This set of examples demonstrates that for a BMF web made of polypropylene (BMF-22) containing 1 wt % of Charge Additive-5 (substantially equivalent to that used in Ex. 15), by using Charging Method-1 (hydrocharging only) with a solution containing an organic solvent (10 wt % ethanol in DI water), with 50 PPM of $CH_3COOH$ (pH 5.2) the QF of Ex. 39 (2.57) was greater than that of Comp. Ex. 39a (1.75) charged with the 10 wt % ethanol in DI water (pH 8.8) alone or Comp. Ex. 39b (1.34) charged with 50 PPM of $Na_2CO_3$ (pH 10.3).

Comparative Example 40 & Examples 40a, 40b

This set of examples demonstrates that for a BMF web made of polypropylene (BMF-23) containing 0.5 wt % Charging Additive-5, by using Charging Method-1 (hydrocharging only) with 20 PPM of HCl (pH 3.4) the QF of Ex. 40a (2.23) was greater than that of Comp. Ex. 40 (1.85) charged with DI water (pH 7.7) alone. Hydrocharging the web (BMF-23) a second time with the same 20 PPM HCl solution (pH 3.4), further increases the QF of Ex 40b (2.31).

Comparative Example 41 & Examples 41a, 41b

This set of examples demonstrates that for a BMF web made of polypropylene (BMF-24) containing 1 wt % Charging Additive-5 (substantially equivalent to that used in Ex. 15), by using Charging Method-1 (hydrocharging only) with 10 PPM of $CH_3COOH$ (pH 6, conductivity 21.6 microS/cm) the QF of Ex. 41a (2.76) was greater than that of Comp. Ex. 41 (2.59) charged with DI water (pH 7.3) alone. With an increasing amount of $CH_3COOH$ in the hydrocharging solution for Ex. 41b (100 PPM, pH 4, conductivity 70.6 microS/cm, QF 2.87), the QF increases.

Comparative Examples 42a, 42b & Example 42

This set of examples demonstrates that for a BMF web made of polypropylene (BMF-25) containing 1 wt % Charging Additive-5 (substantially equivalent to that used in Ex. 15), by using Charging Method-1 (hydrocharging only) with 100 PPM of $CuCl_2$ (pH 5.5, conductivity 146.5 microS/cm) the QF of Ex. 42 (2.24) was greater than that of Comp. Ex. 42a (2.13) charged with DI water (pH 6.1) alone. With an increasing amount of $CuCl_2$ in the hydrocharging solution for Comp. Ex. 42b (5000 PPM, pH 4.5, conductivity 5980 microS/cm, QF 1.88), the QF decreases.

Comparative Examples 43a, 43b & Examples 43a, 43b, 43c

This set of examples demonstrates that for a BMF web made of polypropylene (BMF-26) containing 1 wt % of Charge Additive-5 (substantially equivalent to that used in Ex. 15), by using Charging Method-1 (hydrocharging only) with 50 PPM of $CH_3COOH$ (pH 4.6, conductivity 45.3 microS/cm) the quality factor of Ex. 43a (2.34) was greater than that of Comp. Ex. 43 (2.06) charged with DI water (pH 7.6) alone. By adding increasing amounts of the neutral salt NaCl to the acidic 50 PPM $CH_3COOH$ hydrocharging solution of Ex. 43a, the pH is slightly decreased, but the conductivity increases significantly, and the QFs of Ex. 43b (50 PPM $CH_3COOH$, 50 PPM NaCl, pH 4.4, conductivity 130.2 microS/cm, QF 2.16), Ex. 43c (50 PPM $CH_3COOH$, 500 PPM NaCl, pH 4.0, conductivity 280.6 microS/cm, QF 2.13), and Comp. Ex. 43b ($CH_3COOH$ $Na_2CO_3$, 5000 PPM NaCl, pH 4.0, conductivity 9230 microS/cm, QF 1.94) decrease in comparison to Ex. 43a.

Comparative Examples 44a, 44b, & Example 44

This set of examples demonstrates that for a BMF web made of polypropylene (BMF-27) containing 1 wt % of Charge Additive-4, by using Charging Method-1 (hydrocharging only) with 50 PPM $CH_3COOH$ (pH 4.2) the quality factor of Ex. 44 (1.86) was greater than that of Comp. Ex. 44a (0.56) charged with DI water (pH 8.2) alone or Comp. Ex. 44b (0.85) charged with 50 PPM of $Na_2CO_3$ (pH 10.4).

Comparative Examples 45a, 45b, & Examples 45a, 45b, 45c

This set of examples demonstrates that for a BMF web made of polypropylene (BMF-28) containing 0.1 wt % of Charge Additive-9, by using Charging Method-1 (hydrocharging only) with 100 PPM $CH_3COOH$ (pH 3.9) the quality factor of Ex. 45a (1.72) was greater than that of Comp. Ex. 45a (0.79) charged with DI water (pH 7.2) alone or Comp. Ex. 45b (0.37) charged with 100 PPM of $Na_2CO_3$ (pH 10.7). Further, for BMF-29 containing 0.5 wt % of Charge Additive-9, hydrocharging with the same 100 PPM $CH_3COOH$ solution (pH 3.9) resulted in a higher QF (2.76) for Ex. 45b, and for BMF-30 also containing 0.5 wt % of Charge Additive-9, hydrocharging with a 10 PPM HCl solution (pH 4.2) also resulted in a higher QF (2.57) for Ex. 45c than Ex. 45a.

Comparative Examples 46a, 46b, & Example 46

This set of examples demonstrates that for a BMF web made of polypropylene (BMF-32) containing 0.5 wt % of Charge Additive-11, by using Charging Method-1 (hydrocharging only) with 50 PPM $CH_3COOH$ (pH 4.1) the quality factor of Ex. 46 (1.83) was greater than that of Comp. Ex. 46a (0.26) charged with DI water (pH 7.2) alone or Comp. Ex. 46b (0.45) charged with 50 PPM of $Na_2CO_3$ (pH 10.5).

Comparative Examples 47a, 47b, & Example 47

This set of examples demonstrates that for a BMF web made of polypropylene (BMF-33) containing 0.5 wt % of Charge Additive-12, by using Charging Method-1 (hydrocharging only) with 50 PPM $CH_3COOH$ (pH 4.1) the quality factor of Ex. 47 (1.40) was greater than that of Comp. Ex. 47a (0.24) charged with DI water (pH 7.2) alone or Comp. Ex. 47b (0.39) charged with 50 PPM of $Na_2CO_3$ (pH 10.5).

Comparative Examples 48a, 48b, & Example 48

This set of examples demonstrates that for a BMF web made of polypropylene (BMF-34) containing 1 wt % of Charge Additive-13, by using Charging Method-1 (hydrocharging only) with 50 PPM $CH_3COOH$ (pH 4.1) the quality factor of Ex. 48 (1.68) was greater than that of Comp. Ex. 48a (0.62) charged with DI water (pH 7.2) alone or Comp. Ex. 48b (0.65) charged with 50 PPM of Na₂CO₃ (pH 10.5).

Comparative Examples 49a, 49b, & Example 49

This set of examples demonstrates that for a BMF web made of polypropylene (BMF-36) containing 1 wt % of Charge Additive-14, by using Charging Method-1 (hydrocharging only) with 50 PPM Na₂CO₃ (pH 10.5) the quality factor of Ex. 49 (0.99) was greater than that of Comp. Ex. 49a (0.60) charged with DI water (pH 7.2) alone or Comp. Ex. 49b (0.49) charged with 50 PPM of CH₃COOH (pH 4.1).

Comparative Examples 50a, 50b, & Example 50

This set of examples demonstrates that for a BMF web made of polypropylene (BMF-38) containing 0.5 wt % of Charge Additive-1 and 0.4 wt % of Charge Additive-7, by using Charging Method-1 (hydrocharging only) with 50 PPM Na₂CO₃ (pH 10.4) the quality factor of Ex. 50 (1.61) was greater than that of Comp. Ex. 50a (1.02) charged with DI water (pH 7.7) alone or Comp. Ex. 50b (0.34) charged with 50 PPM of CH₃COOH (pH 4.2).

Comparative Examples 51a, 51b & Examples 51a, 51b

This set of examples demonstrates that for a BMF web made of polypropylene (BMF-39) containing 0.5 wt % of Charge Additive-1 and 0.2 wt % of Charge Additive-8, by using Charging Method-1 (hydrocharging only) with 50 PPM Na₂CO₃ (pH 10.4, conductivity 131.8) the quality factor of Ex. 51a (1.59) was greater than that of Comp. Ex. 51 (1.25) charged with DI water (pH 7.7) alone. By adding increasing amounts of the neutral salt NaCl to the basic 50 PPM Na₂CO₃ hydrocharging solution of Ex. 51a, the pH is very slightly decreased, but the conductivity increases significantly, and the QFs of Ex. 51b (50 PPM Na₂CO₃, 50 PPM NaCl, pH 10.3, conductivity 230.4 microS/cm, QF 1.42) and Comp. Ex. 51b (50 PPM Na₂CO₃, 5000 PPM NaCl, pH 10.3, conductivity 9340 microS/cm, QF 0.77) decrease in comparison to Ex. 51a.

Comparative Examples 52, 53, 54, 55, 56 & Examples 52, 53, 54, 55, 56

This set of examples demonstrates that for BMF webs made of polypropylene (BMF-40, 41, 42, 43 & 44) containing 1 wt % Charging Additive-1 of varying EFDs, basis weights, and fiber size distributions (i.e. Extrusion Method-1 vs. Extrusion Method-2), by using Charging Method-1 (hydrocharging only) with 100 PPM of Na₂CO₃ (pH 9.2) the QFs of Ex. 52 (1.77), Ex. 53 (2.19), Ex. 54 (1.77), Ex. 55 (2.55), and Ex. 56 (2.03) were all greater than their corresponding Comparative Example: Comp. Ex. 52 (0.86), Comp. Ex. 53 (0.91), Comp. Ex. 54 (0.88), Comp. Ex. 55 (1.17), and Comp. Ex. 56 (0.81) charged with DI water (pH 7.0) alone.

Comparative Examples 57a, 57b, & Example 57

This set of examples demonstrates that for a BMF web made of polypropylene (BMF-45) with Extrusion Method-2 containing 0.5 wt % of Charge Additive-6 and 0.2 wt % of Charge Additive-9, by using Charging Method-1 (hydrocharging only) with 50 PPM of CH₃COOH (pH 4.2) the quality factor of Ex. 57 (3.48) was greater than that of Comp. Ex. 57a (3.07) charged with DI water (pH 7.7) alone or Comp. Ex. 57b (1.68) charged with 50 PPM Na₂CO₃ (pH 10.4).

Comparative Examples 58 & Example 58a

This set of examples demonstrates that for a BMF web made of polypropylene (BMF-46) with Extrusion Method-2 containing 0.8 wt % of Charge Additive-5, by using Charging Method-1 (hydrocharging only) with 10 PPM of CH₃COOH (pH 5.4) the quality factor of Ex. 58 (3.50) was greater than that of Comp. Ex. 58 (2.58) charged with DI water (pH 8.8) alone.

Comparative Examples 59a, 59b, & Example 59

This set of examples demonstrates that for a BMF web made of polylactide (BMF-51) containing 1 wt % of Charge Additive-1, by using Charging Method-1 (hydrocharging only) with 20 PPM of NaOH (pH 11) the quality factor of Ex. 59 (1.42) was greater than that of Comp. Ex. 59a (1.10) charged with DI water (pH 7.7) alone or Comp. Ex. 59b (0.48) charged with 20 PPM HCl (pH 3.5).

Comparative Examples 60a, 60b, & Example 60

This set of examples demonstrates that for a BMF web made of 95% polypropylene and 5% cyclic olefin copolymer (BMF-52) containing no charging additive, by using Charging Method-1 (hydrocharging only) with 20 PPM of NaOH (pH 11) the quality factor of Ex. 60 (2.21) was greater than that of Comp. Ex. 60a (1.77) charged with DI water (pH 7.7) alone or Comp. Ex. 60b (0.70) charged with 20 PPM HCl (pH 3.5).

TABLE 5

Summary of BMF charging methods and resulting aerosol filtration performance characteristics.

| Example Number | BMF Web Number | Zeta Pot.ᵃ (mV) | Charging Method | Compound(s) in Charging Fluid | Concn. of Compound(s) in Charging Fluid (PPM) | Charging Fluid Conductivity (microS/cm) | Charging Fluid pH | % Pen. | Pressure Drop (mm H2O) | QF (1/mm H2O) |
|---|---|---|---|---|---|---|---|---|---|---|
| C 1a | 1 | −9.3 | 1 | None | | 0.31 | 7.5 | 55.73 | 2.18 | 0.27 |
| 1 | 1 | −9.3 | 1 | Na₂CO₃ | 50 | 124.5 | 10.6 | 44.63 | 2.45 | 0.33 |
| C 1b | 1 | −9.3 | 1 | CH₃COOH | 50 | 65 | 4.2 | 57.35 | 2.35 | 0.24 |
| C 2a | 2 | −10.8 | 2 | None | | 1.3 | 8.1 | 19.95 | 2.08 | 0.78 |
| 2 | 2 | −10.8 | 2 | Na₂CO₃ | 50 | 138.3 | 10.5 | 11.35 | 2.10 | 1.04 |
| C 2b | 2 | −10.8 | 2 | CH₃COOH | 50 | 43.2 | 4.3 | 25.62 | 2.10 | 0.65 |
| 3a | 6 | −10.2 | 1 | None | | 6.44 | 7.5 | 7.56 | 2.53 | 1.02 |
| 3b | 6 | −10.2 | 1 | Na₂CO₃ | 50 | 113.7 | 10.1 | 2.67 | 2.60 | 1.41 |
| C 3 | 6 | −10.2 | 1 | CH₃COOH | 50 | 64.8 | 4.4 | 49.05 | 2.40 | 0.30 |

TABLE 5-continued

Summary of BMF charging methods and resulting aerosol filtration performance characteristics.

| Example Number | BMF Web Number | Zeta Pot.[a] (mV) | Charging Method | Compound(s) in Charging Fluid | Concn. of Compound(s) in Charging Fluid (PPM) | Charging Fluid Conductivity (microS/cm) | Charging Fluid pH | % Pen. | Pressure Drop (mm H2O) | QF (1/mm H2O) |
|---|---|---|---|---|---|---|---|---|---|---|
| C 4a | 6 | −10.8 | 2 | None | | 1.2 | 8.2 | 3.77 | 2.65 | 1.24 |
| 4 | 6 | −10.8 | 2 | Na$_2$CO$_3$ | 50 | 136.40 | 10.4 | 1.45 | 2.67 | 1.59 |
| C 4b | 6 | −10.8 | 2 | CH$_3$COOH | 50 | 46.50 | 4.2 | 29.63 | 2.60 | 0.47 |
| C 5a | 6 | −10.2 | 1 | Acetone | 10 wt % | 0.52 | 9.7 | 4.51 | 2.73 | 1.15 |
| 5 | 6 | −10.2 | 1 | Acetone & Na$_2$CO$_3$ | 10 wt %/50 PPM | 112.80 | 10.7 | 2.08 | 2.75 | 1.41 |
| C 5b | 6 | −10.2 | 1 | Acetone & CH$_3$COOH | 10 wt %/50 PPM | 28.34 | 5.0 | 59.75 | 2.57 | 0.20 |
| C 6a | 10 | −10.7 | 2 | None | | 1.2 | 8.2 | 5.05 | 2.35 | 1.28 |
| 6 | 10 | −10.7 | 2 | Na$_2$CO$_3$ | 50 | 136.40 | 10.4 | 1.75 | 2.52 | 1.61 |
| C 6b | 10 | −10.7 | 2 | CH$_3$COOH | 50 | 46.50 | 4.2 | 31.30 | 2.52 | 0.46 |
| C 7a | 10 | −10.9 | 1 | None | | 0.8 | 7.2 | 9.02 | 2.28 | 1.06 |
| 7a | 10 | −10.9 | 1 | Na$_2$CO$_3$ | 50 | 139 | 10.5 | 2.15 | 2.38 | 1.62 |
| 7b | 10 | −10.9 | 1 | Na$_2$CO$_3$ & NaCl | 50/50 | 230.4 | 10.3 | 2.99 | 2.43 | 1.45 |
| 7c | 10 | −10.9 | 1 | Na$_2$CO$_3$ & NaCl | 50/500 | 1150 | 10.3 | 5.94 | 2.27 | 1.25 |
| C 7b | 10 | −10.9 | 1 | Na$_2$CO$_3$ & NaCl | 50/5000 | 9340 | 10.3 | 17.05 | 2.37 | 0.75 |
| C 8a | 14 | −8.4 | 2 | None | | 1.2 | 8.2 | 13.40 | 1.77 | 1.15 |
| 8 | 14 | −8.4 | 2 | Na$_2$CO$_3$ | 50 | 136.40 | 10.4 | 2.87 | 2.03 | 1.75 |
| C 8b | 14 | −8.4 | 2 | CH$_3$COOH | 50 | 46.50 | 4.2 | 24.40 | 2.03 | 0.70 |
| C 9a | 14 | −11.8 | 1 | None | | 1.2 | 8.2 | 15.10 | 1.67 | 1.14 |
| 9a | 14 | −11.8 | 1 | Na$_2$CO$_3$ | 50 | 136.40 | 10.4 | 4.07 | 1.75 | 1.85 |
| 9b | 14 | −11.8 | 1 | Na$_2$CO$_3$ & NaCl | 50/50 | 230.4 | 10.3 | 6.71 | 1.77 | 1.53 |
| 9c | 14 | −11.8 | 1 | Na$_2$CO$_3$ & NaCl | 50/500 | 1150 | 10.3 | 9.60 | 1.77 | 1.33 |
| C 9b | 14 | −11.8 | 1 | Na$_2$CO$_3$ & NaCl | 50/5000 | 9340 | 10.3 | 20.00 | 1.78 | 0.90 |
| C 9c | 14 | −11.8 | 1 | CH$_3$COOH | 50 | 46.50 | 4.2 | 44.58 | 1.70 | 0.48 |
| C 10a | 15 | −10.4 | 1 | None | | 0.8 | 7.2 | 12.70 | 1.92 | 1.08 |
| 10 | 15 | −10.4 | 1 | Na$_2$CO$_3$ | 50 | 139 | 10.5 | 7.19 | 1.82 | 1.46 |
| C 10b | 15 | −10.4 | 1 | CH$_3$COOH | 50 | 44.6 | 4.1 | 27.90 | 1.93 | 0.66 |
| C 11a | 16 | −9.6 | 2 | None | | 1.3 | 8.1 | 13.90 | 1.22 | 1.63 |
| 11 | 16 | −9.6 | 2 | Na$_2$CO$_3$ | 50 | 138.3 | 10.5 | 8.87 | 1.18 | 2.05 |
| C 11b | 16 | −9.6 | 2 | CH$_3$COOH | 50 | 43.2 | 4.3 | 12.13 | 1.23 | 1.72 |
| C 12a | 17 | −24.1 | 3 | None | | 1.2 | 8.2 | 0.13 | 3.05 | 2.18 |
| 12a | 17 | −24.1 | 3 | Na$_2$CO$_3$ | 50 | 136.40 | 10.4 | 0.06 | 3.18 | 2.35 |
| 12b | 17 | −24.1 | 3 | NH$_4$OH | 10 | 22.11 | 10.6 | 0.07 | 3.05 | 2.38 |
| C 12b | 17 | −24.1 | 3 | CH$_3$COOH | 50 | 46.50 | 4.2 | 0.24 | 3.10 | 1.96 |
| C 13a | 19 | 3.8 | 1 | None | | 1.2 | 8.2 | 0.67 | 2.15 | 2.35 |
| 13 | 19 | 3.8 | 1 | CH$_3$COOH | 50 | 46.50 | 4.2 | 0.63 | 2.13 | 2.40 |
| C 13b | 19 | 3.8 | 1 | Na$_2$CO$_3$ | 50 | 136.40 | 10.4 | 7.06 | 2.20 | 1.21 |
| C 14a | 18 | 0.5 | 2 | None | | 1.2 | 8.2 | 1.63 | 4.81 | 1.88 |
| 14 | 18 | 0.5 | 2 | CH$_3$COOH | 50 | 46.50 | 4.2 | 1.58 | 2.58 | 2.32 |
| C 14b | 18 | 0.5 | 2 | Na$_2$CO$_3$ | 50 | 136.40 | 10.4 | 1.35 | 10.53 | 1.68 |
| C 15a | 20 | −1.9 | 1 | None | | 6.44 | 7.5 | 4.99 | 1.38 | 2.18 |
| 15 | 20 | −1.9 | 1 | CH$_3$COOH | 50 | 64.8 | 4.4 | 2.37 | 1.33 | 2.85 |
| C 15b | 20 | −1.9 | 1 | Na$_2$CO$_3$ | 50 | 113.7 | 10.1 | 13.58 | 1.30 | 1.55 |
| C 16a | 21 | −3.3 | 2 | None | | 1.2 | 8.2 | 9.49 | 1.48 | 1.59 |
| 16 | 21 | −3.3 | 2 | CH$_3$COOH | 50 | 46.50 | 4.2 | 1.96 | 1.68 | 2.34 |
| C 16b | 21 | −3.3 | 2 | Na$_2$CO$_3$ | 50 | 136.40 | 10.4 | 11.81 | 1.50 | 1.43 |
| C 17a | 31 | −6 | 1 | None | | 1.2 | 8.2 | 37.15 | 2.03 | 0.50 |
| 17 | 31 | −6 | 1 | CH$_3$COOH | 50 | 46.50 | 4.2 | 2.58 | 2.18 | 1.68 |
| C 17b | 31 | −6 | 1 | Na$_2$CO$_3$ | 50 | 136.40 | 10.4 | 46.38 | 2.22 | 0.35 |
| C 18a | 35 | −1 | 1 | None | | 1.2 | 8.2 | 3.67 | 1.50 | 2.22 |
| 18 | 35 | −1 | 1 | CH$_3$COOH | 50 | 46.50 | 4.2 | 1.56 | 1.58 | 2.64 |
| C 18b | 35 | −1 | 1 | Na$_2$CO$_3$ | 50 | 136.40 | 10.4 | 10.51 | 1.60 | 1.42 |
| C 19a | 37 | 0.6 | 1 | None | | 1.2 | 8.2 | 0.74 | 2.10 | 2.35 |
| 19 | 37 | 0.6 | 1 | CH$_3$COOH | 50 | 46.50 | 4.2 | 0.17 | 2.12 | 3.04 |
| C 19b | 37 | 0.6 | 1 | Na$_2$CO$_3$ | 50 | 136.40 | 10.4 | 12.37 | 2.12 | 0.99 |
| C 20a | 47 | 2.7 | 1 | None | | 1.3 | 8.1 | 13.93 | 1.55 | 1.28 |
| 20 | 47 | 2.7 | 1 | CH$_3$COOH | 50 | 43.2 | 4.3 | 7.25 | 1.58 | 1.70 |
| C 20 b | 47 | 2.7 | 1 | Na$_2$CO$_3$ | 50 | 138.3 | 10.5 | 23.28 | 1.62 | 0.92 |
| C 21a | 48 | −9.9 | 1 | None | | 6.32 | 5.9 | 44.98 | 1.94 | 0.41 |
| 21 | 48 | −9.9 | 1 | Na$_2$CO$_3$ | 50 | 131.1 | 10.8 | 3.82 | 1.92 | 1.72 |
| C 21b | 48 | −9.9 | 1 | CH$_3$COOH | 50 | 67.4 | 4.6 | 37.14 | 1.94 | 0.52 |
| C 22 | 48 | −9.9 | 1 | None | | 5.3 | 6.0 | 70.50 | 1.80 | 0.19 |
| 22a | 48 | −9.9 | 1 | Na$_2$CO$_3$ | 10 | 25.9 | 8.2 | 54.30 | 1.88 | 0.33 |
| 22b | 48 | −9.9 | 1 | Na$_2$CO$_3$ | 100 | 177.6 | 9.7 | 48.48 | 1.82 | 0.40 |
| C 23a | 49 | −8.3 | 1 | None | | 6.32 | 5.9 | 46.18 | 1.92 | 0.41 |
| 23 | 49 | −8.3 | 1 | Na$_2$CO$_3$ | 50 | 131.1 | 10.8 | 10.70 | 1.90 | 1.39 |
| C 23b | 49 | −8.3 | 1 | CH$_3$COOH | 50 | 67.4 | 4.6 | 55.44 | 1.88 | 0.33 |
| C 24 | 49 | −8.3 | 1 | None | | 5.3 | 6.0 | 46.97 | 1.77 | 0.54 |
| 24a | 49 | −8.3 | 1 | Na$_2$CO$_3$ | 10 | 25.9 | 8.2 | 33.34 | 1.80 | 0.72 |
| 24b | 49 | −8.3 | 1 | Na$_2$CO$_3$ | 100 | 177.6 | 9.7 | 27.28 | 1.83 | 0.91 |
| 25a | 50 | −4.8 | 1 | None | | 6.32 | 5.9 | 31.00 | 1.00 | 1.18 |

TABLE 5-continued

Summary of BMF charging methods and resulting aerosol filtration performance characteristics.

| Example Number | BMF Web Number | Zeta Pot.[a] (mV) | Charging Method | Comp

TABLE 5-continued

Summary of BMF charging methods and resulting aerosol filtration performance characteristics.

| Example Number | BMF Web Number | Zeta Pot.[a] (mV) | Charging Method | Compound(s) in Charging Fluid | Concn. of Compound(s) in Charging Fluid (PPM) | Charging Fluid Conductivity (microS/cm) | Charging Fluid pH | % Pen. | Pressure Drop (mm H2O) | QF (1/mm H2O) |
|---|---|---|---|---|---|---|---|---|---|---|
| C 39b | 22 | N.M. | 1 | $CH_3COOH$ Ethanol & $Na_2CO_3$ | 10 wt %/50 PPM | 92.30 | 10.3 | 15.18 | 1.42 | 1.34 |
| C 40 | 23 | N.M. | 1 | None | | 0.43 | 7.7 | 0.95 | 2.53 | 1.85 |
| 40a | 23 | N.M. | 1 | HCl | 20 | 263.3 | 3.4 | 0.46 | 2.42 | 2.23 |
| 40b | 23 | N.M. | 1 | HCl | 20 | 263.3 | 3.4 | 0.42 | 2.38 | 2.31 |
| C 41 | 24 | N.M. | 1 | None | | 7.88 | 7.3 | 0.57 | 2.00 | 2.59 |
| 41a | 24 | N.M. | 1 | $CH_3COOH$ | 10 | 21.6 | 6.0 | 0.45 | 1.97 | 2.76 |
| 41b | 24 | N.M. | 1 | $CH_3COOH$ | 100 | 70.6 | 4.0 | 0.37 | 1.95 | 2.87 |
| C 42a | 25 | N.M. | 1 | None | | 2.78 | 6.1 | 0.77 | 2.35 | 2.13 |
| 42a | 25 | N.M. | 1 | $CuCl_2$ | 100 | 146.5 | 5.5 | 0.58 | 2.35 | 2.24 |
| C 42b | 25 | N.M. | 1 | $CuCl_2$ | 5000 | 5980 | 4.5 | 1.37 | 2.35 | 1.88 |
| C 43a | 26 | N.M. | 1 | None | | 0.35 | 7.6 | 1.87 | 1.95 | 2.06 |
| 43a | 26 | N.M. | 1 | $CH_3COOH$ | 50 | 45.3 | 4.6 | 0.80 | 2.12 | 2.34 |
| 43b | 26 | N.M. | 1 | $CH_3COOH$ & NaCl | 50/50 | 130.2 | 4.4 | 2.03 | 1.83 | 2.16 |
| 43c | 26 | N.M. | 1 | $CH_3COOH$ & NaCl | 50/500 | 280.6 | 4.0 | 1.11 | 2.13 | 2.13 |
| C 43b | 26 | N.M. | 1 | $CH_3COOH$ & NaCl | 50/5000 | 9230 | 4.0 | 2.08 | 2.02 | 1.94 |
| C 44a | 27 | N.M. | 1 | None | | 1.2 | 8.2 | 20.25 | 2.88 | 0.56 |
| 44 | 27 | N.M. | 1 | $CH_3COOH$ | 50 | 46.50 | 4.2 | 0.27 | 3.25 | 1.86 |
| C 44b | 27 | N.M. | 1 | $Na_2CO_3$ | 50 | 136.40 | 10.4 | 8.76 | 2.90 | 0.85 |
| C 45a | 28 | N.M. | 1 | None | | 0.8 | 7.2 | 27.27 | 1.65 | 0.79 |
| 45a | 28 | N.M. | 1 | $CH_3COOH$ | 100 | 66.2 | 3.9 | 4.89 | 1.77 | 1.72 |
| 45b | 29 | N.M. | 1 | $CH_3COOH$ | 100 | 66.2 | 3.9 | 1.70 | 1.48 | 2.76 |
| 45c | 30 | N.M. | 1 | HCl | 10 | 124 | 4.2 | 0.42 | 2.17 | 2.57 |
| C 45b | 28 | N.M. | 1 | $Na_2CO_3$ | 100 | 243 | 10.7 | 57.05 | 1.53 | 0.37 |
| C 46a | 32 | N.M. | 1 | None | | 0.8 | 7.2 | 65.65 | 1.65 | 0.26 |
| 46 | 32 | N.M. | 1 | $CH_3COOH$ | 50 | 44.6 | 4.1 | 3.47 | 1.85 | 1.83 |
| C 46b | 32 | N.M. | 1 | $Na_2CO_3$ | 50 | 139 | 10.5 | 45.17 | 1.78 | 0.45 |
| C 47a | 33 | N.M. | 1 | None | | 0.8 | 7.2 | 68.75 | 1.57 | 0.24 |
| 47 | 33 | N.M. | 1 | $CH_3COOH$ | 50 | 44.6 | 4.1 | 9.82 | 1.67 | 1.40 |
| C 47b | 33 | N.M. | 1 | $Na_2CO_3$ | 50 | 139 | 10.5 | 52.23 | 1.68 | 0.39 |
| C 48a | 34 | N.M. | 1 | None | | 0.8 | 7.2 | 35.28 | 1.70 | 0.62 |
| 48 | 34 | N.M. | 1 | $CH_3COOH$ | 50 | 44.6 | 4.1 | 4.40 | 1.87 | 1.68 |
| C 48b | 34 | N.M. | 1 | $Na_2CO_3$ | 50 | 139 | 10.5 | 30.52 | 1.83 | 0.65 |
| C 49a | 36 | N.M. | 1 | None | | 0.8 | 7.2 | 31.52 | 2.00 | 0.60 |
| 49 | 36 | N.M. | 1 | $Na_2CO_3$ | 50 | 139 | 10.5 | 11.30 | 2.26 | 0.99 |
| C 49b | 36 | N.M. | 1 | $CH_3COOH$ | 50 | 44.6 | 4.1 | 35.58 | 2.14 | 0.49 |
| C 50a | 38 | N.M. | 1 | None | | 1.14 | 7.7 | 19.97 | 1.58 | 1.02 |
| 50 | 38 | N.M. | 1 | $Na_2CO_3$ | 50 | 131.8 | 10.4 | 56.33 | 1.70 | 1.61 |
| C 50b | 38 | N.M. | 1 | $CH_3COOH$ | 50 | 45.3 | 4.2 | 5.88 | 1.77 | 0.34 |
| C 51a | 39 | N.M. | 1 | None | | 1.14 | 7.7 | 10.64 | 1.80 | 1.25 |
| 51a | 39 | N.M. | 1 | $Na_2CO_3$ | 50 | 131.8 | 10.4 | 3.75 | 2.04 | 1.59 |
| 51b | 39 | N.M. | 1 | $Na_2CO_3$ & NaCl | 50/50 | 230.4 | 10.3 | 5.38 | 2.07 | 1.42 |
| C 51b | 39 | N.M. | 1 | $Na_2CO_3$ & NaCl | 50/5000 | 9340 | 10.3 | 19.93 | 2.08 | 0.77 |
| C 52 | 40 | N.M. | 1 | None | | 7.01 | 7.0 | 16.40 | 2.12 | 0.86 |
| 52 | 40 | N.M. | 1 | $Na_2CO_3$ | 100 | 186.4 | 9.2 | 2.54 | 2.08 | 1.77 |
| C53 | 41 | N.M. | 1 | None | | 7.01 | 7.0 | 62.40 | 0.53 | 0.91 |
| 53 | 41 | N.M. | 1 | $Na_2CO_3$ | 100 | 186.4 | 9.2 | 32.47 | 0.52 | 2.19 |
| C54 | 42 | N.M. | 1 | None | | 7.01 | 7.0 | 12.65 | 2.35 | 0.88 |
| 54 | 42 | N.M. | 1 | $Na_2CO_3$ | 100 | 186.4 | 9.2 | 1.87 | 2.27 | 1.77 |
| C55 | 43 | N.M. | 1 | None | | 7.01 | 7.0 | 55.60 | 0.52 | 1.17 |
| 55 | 43 | N.M. | 1 | $Na_2CO_3$ | 100 | 186.4 | 9.2 | 27.45 | 0.52 | 2.55 |
| C56 | 44 | N.M. | 1 | None | | 7.01 | 7.0 | 27.98 | 1.58 | 0.81 |
| 56 | 44 | N.M. | 1 | $Na_2CO_3$ | 100 | 186.4 | 9.2 | 4.12 | 1.58 | 2.03 |
| C57a | 45 | N.M. | 1 | None | | 3.04 | 7.7 | 6.79 | 0.88 | 3.07 |
| 57 | 45 | N.M. | 1 | $CH_3COOH$ | 50 | 44.7 | 4.2 | 5.59 | 0.83 | 3.48 |
| C57b | 45 | N.M. | 1 | Na2CO3 | 50 | 127.1 | 10.4 | 24.28 | 0.85 | 1.68 |
| C58 | 46 | N.M. | 1 | None | | 0.73 | 8.8 | 18.12 | 0.67 | 2.58 |
| 58a | 46 | N.M. | 1 | $CH_3COOH$ | 10 | 18.2 | 5.4 | 11.90 | 0.62 | 3.50 |
| C 59a | 51 | N.M. | 1 | None | | 1.28 | 7.7 | 17.95 | 1.57 | 1.10 |
| 59 | 51 | N.M. | 1 | NaOH | 20 | 129.5 | 11.0 | 10.19 | 1.62 | 1.42 |
| C 59b | 51 | N.M. | 1 | HCl | 20 | 254 | 3.5 | 46.35 | 1.60 | 0.48 |
| C 60a | 52 | N.M. | 1 | None | | 1.28 | 7.7 | 12.37 | 1.18 | 1.77 |
| 60 | 52 | N.M. | 1 | NaOH | 20 | 129.5 | 11.0 | 5.88 | 1.28 | 2.21 |
| C 60b | 52 | N.M. | 1 | HCl | 20 | 254 | 3.5 | 43.60 | 1.20 | 0.70 |

[a]N.M. designates Not Measured. Zeta potential predicted based on measurements on substantially similar material.

[b]pH and conductivity were not measured at the time of charging. The values reported are for a solution of an equivalent composition.

Examples 61-66

Using the Computational Chemistry Methods described above, the PA and $\Delta H_{dp}$ were computed for model chemical systems that are equivalent to the amino substituted aromatic charging additives described above (i.e. Charging Additives 1 through 6 and 15), with respect to the electronic structure of the charging center. The model structures are given below, and we truncate the aliphatic tails to reduce the required computational time. To justify the truncation of the aliphatic tail, we examine how the tail will affect the electronic structure of the charging center, where the charging center is the protonation/deprotonation site. The degree to which a functional group affects the electronic structure of an aromatic center can be understood through the Hammett-Sigma parameter, $\sigma_p$ (Dean, J. A., Physicochemical Relationships. *Lange's Handbook of Chemistry*, 15th Edition; McGraw-Hill: New York, 1999.). The $\sigma_p$ values for R=$CH_3$, $CH_2CH_3$, $CH_2CH_2CH_3$, and $CH_2CH_2CH_2CH_3$ are −0.17, −0.15, −0.15, and −0.16, respectively. The similarity of the $\sigma_p$ values for these R groups indicates that the number of methylene repeat groups will not significantly affect the electronic structure of the charging center. Examples of the R-groups that are chemically different would be R=—H, —$CH_3$, and CO—$OCH_3$, and the $\sigma_p$ values for these R-groups are 0.0, −0.17, and 0.39, respectively (Dean, J. A., Physicochemical Relationships. *Lange's Handbook of Chemistry*, 15th Edition; McGraw-Hill: New York, 1999.).

Proton Affinity: Table 6 reports the PA for the structured models in addition to providing the typical QFs of BMF webs containing the equivalent charging additives charged with different pH charging fluids and the corresponding preferred pH based on the calculated PA and $\Delta H_{dp}$ (described below). These results suggest that the PA of the molecule correlates well with the charging properties of the additives in two ways. The first observation is that a PA value greater than about 230 kcal/mol will improve the performance of web samples that are charged with an acidic water spray, and that additives with a PA value of less than about 230 kcal/mol do not improve the performance of web samples that are contacted with an acidic water spray.

Deprotonation Enthalpy: Table 6 also reports the $\Delta H_{dp}$ for all of the model systems. These results suggest that the $\Delta H_{dp}$ of the molecule correlates well with the charging properties of the additives in ways that are analogous to PA. The first observation is that a $\Delta H_{dp}$ value less than about 335 kcal/mol indicates that the additive will improve the performance of a web sample that is charged with a basic water spray, and that additives with a $\Delta H_{dp}$ value of greater than about 335 kcal/mol will not improve the charging behavior of the sample when contacted with a basic water spray. We note that deprotonation is an exothermic process and thus a smaller number is preferred.

The chemical compounds used for modeling the corresponding charging additives.

Structure Model - 1

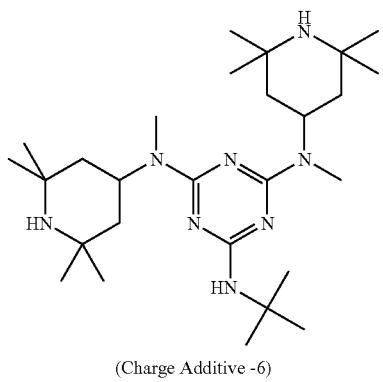

(Charge Additive -6)

Structure Model - 2

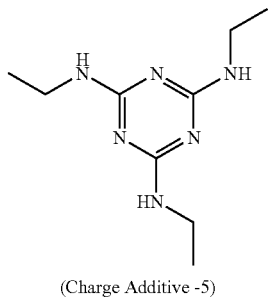

(Charge Additive -5)

Structure Model - 3

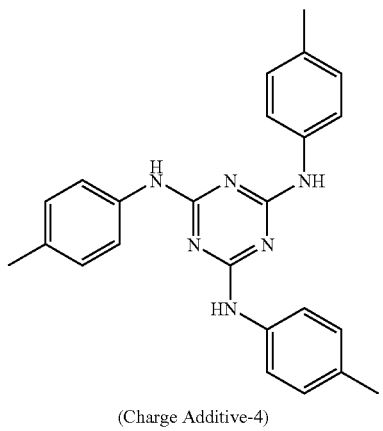

(Charge Additive-4)

Structure Model - 4

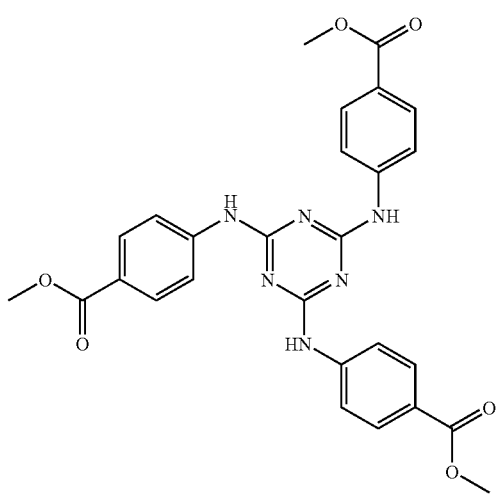

(Charge Additive-1 & 3)

Examples 67-110

In addition to computing the properties for the specific charging additives above, charging properties for a wide variety of charging additives were computed to determine the chemical-scope of the charging additives. To determine the chemical-scope, the two additive classes were examined that are shown above as formulas (1) and (2) Formula (1) includes Structure Model-2, where there is an aromatic core with three (NH)—$CH_2$—$CH_3$ groups bonded to it, and formula (2) includes Structure Models-3, 4, 5, and 6, where there is an aromatic core that is bonded to three para-substituted aniline derivatives. The aromatic cores for these structures are chosen so they have different aromaticities, and the R-groups for formula (2) are selected based on their electron withdrawing/releasing power. The aromatic rings, in order of increasing aromaticity, are triazine, pyrimidine, pyridine, and benzene (Shishkin, O. V.; Pichugin, K. Y.; Gorb, L.; Leszczynski, J. 616 *J. Mol. Struc.* 159 (2002)). The R-groups, in order of increasing electron-withdrawing power, are (NH)—$CH_3$, —OH, —O—$CH_3$, —$CH_3$, —H, —F, —C(=O)—NH—$CH_3$, —C(=O)—O—$CH_3$, $CF_3$, and —$NO_2$. The electron-withdrawing strength is quantified with the Hammett-Sigma parameter, $\sigma_p$ (Dean, J. A., Physicochemical Relationships. *Lange's Handbook of Chemistry*, 15th Edition; McGraw-Hill: New York, 1999).

The PA and $\Delta H_{dp}$ values were calculated for the additives of formula (1) and (2) set forth above and are reported in Table 7. Based on these calculations, all of the formula (1) additives (Examples 67-70) would be basic additives, as their PA values are significantly greater than 230 kcal/mol, and their $\Delta H_{dp}$ values are significantly greater than 335 kcal/mol and thus are predicted to charge better with acidic charging fluid (pH <7).

The purpose of examples 71-106 is to show how the electron withdrawing/releasing power of the R-group affects the acidity or basicity of the charge additives. When R is electron releasing, i.e. $\sigma_p$<0.0, the molecule becomes more basic and when R is electron donating, i.e. $\sigma_p$>0.0, the additive becomes more acidic. The exact value of $\sigma_p$ for the transition between an acidic and basic additive depends on the aromatic core. For example, the transition between acidic and basic for additives with a triazine occurs when $\sigma_p \approx 0$ and the transition between acidic and basic for additives with a benzene core when $\sigma_p \approx 0.32$.

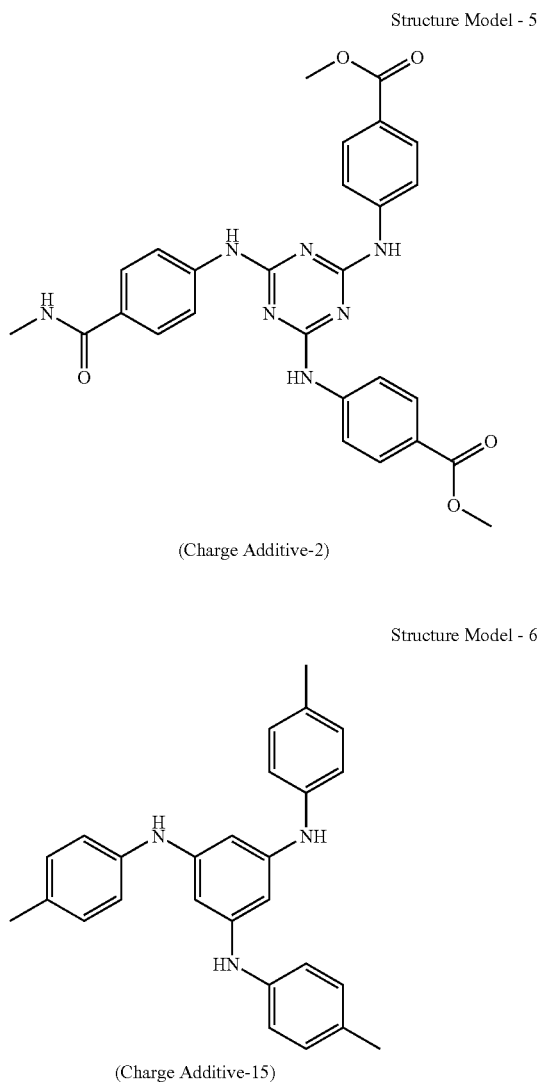

(Charge Additive-2)

(Charge Additive-15)

TABLE 6

Computed PA and $\Delta H_{dp}$ and measured QFs for Model Charging Additives.

| Example Number | Model Structure | PA (kcal/mol) | $\Delta H_{dp}$ (kcal/mol) | Predicted Charging Liquid pH | $QF^a$ (DI water) | $QF^b$ (acidic water) | $QF^c$ (basic water) |
| --- | --- | --- | --- | --- | --- | --- | --- |
| 61 | Model-1 | 242.8 | 356.3 | pH < 7 | 2.35 | 2.40 | 1.21 |
| 62 | Model-2 | 237.0 | 362.6 | pH < 7 | 2.18 | 2.85 | 1.55 |
| 63 | Model-3 | 235.1 | 343.2 | pH < 7 | 0.56 | 1.86 | 0.85 |
| 64 | Model-6 | 245.4 | 347.4 | pH < 7 | 2.22 | 2.64 | 1.42 |
| 65 | Model-4 | 223.9 | 330.1 | pH > 7 | 1.02 | 0.30 | 1.41 |
| 66 | Model-5 | 224.6 | 329.6 | pH > 7 | 1.28 | 0.46 | 1.61 |

[a]DI water: deionized water, measured pHs of DI water were 7.5 for Examples 62 and 65 and 8.2 for Examples 61, 63, 64, and 66.
[b]acidic water: water with 50 ppm $CH_3COOH$; measured pHs of acidic water were 4.2 for Examples 61, 63, 64, and 66 and 4.4 for Examples 62 and 65.
[c]basic water: water with 50 ppm $Na_2CO_3$; measured pHs of basic water were 10.1 for Examples 62 and 65 and 10.4 for Examples 61, 63, 64, and 66.

TABLE 7

Computed PA and $\Delta H_{dp}$ values for Formula (1) and (2) Polymer Additives

| Formula | $\sigma_p$ | R = | PA $\Delta H_{dp}$ Ar = Triazine | PA $\Delta H_{dp}$ Ar = Pyrimidine | PA $\Delta H_{dp}$ Ar = Pyridine | PA $\Delta H_{dp}$ Ar = Benzene |
|---|---|---|---|---|---|---|
| 1 | | | Example 67 237.0  362.7 | Example 68 243.9  363.8 | Example 69 248.3  361.4 | Example 70 250.2  369.7 |
| 2 | −0.84 | 2° Amine | Example 71 246.7  348.5 | Example 72 253.1  349.7 | Example 73 258.7  349.3 | Example 74 257.4  354.3 |
| 2 | −0.37 | Hydroxyl | Example 75 236.8  342.8 | Example 76 243.1  342.6 | Example 77 248.7  342.4 | Example 78 246.9  347.3 |
| 2 | −0.27 | Methoxy | Example 79 238.4  344.1 | Example 80 245.4  344.2 | Example 81 250.9  343.8 | Example 82 249.5  350.1 |
| 2 | −0.17 | Methyl | Example 83 235.1  343.2 | Example 84 241.3  343.5 | Example 85 247.2  342.8 | Example 86 245.4  347.4 |
| 2 | 0.00 | Hydrogen | Example 87 231.0  341.5 | Example 88 237.6  340.1 | Example 89 243.5  340.6 | Example 90 241.4  345.6 |
| 2 | 0.09 | Fluorine | Example 91 226.4  335.1 | Example 92 232.9  334.6 | Example 93 239.1  335.8 | Example 94 237.5  340.4 |
| 2 | | Amide | Example 95 227.0  331.9 | Example 96 233.0  331.2 | Example 97 239.1  329.6 | Example 98 234.9  334.0 |
| 2 | 0.32 | Ester | Example 99 223.8  329.8 | Example 100 230.1  328.6 | Example 101 235.5  327.1 | Example 102 231.9  331.4 |
| 2 | 0.54 | Trifluro | Example 103 216.8  324.7 | Example 104 223.1  324.4 | Example 105 228.8  322.8 | Example 106 225.8  328.1 |
| 2 | 0.78 | Nitro | Example 107 208.2  314.0 | Example 108 214.2  312.9 | Example 109 219.6  311.3 | Example 110 215.6  315.4 |

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A method of making an electret article, which method comprises:
   (a) providing a polymeric article to be charged; and
   (b) contacting the polymeric article to be charged with an aqueous liquid that has a pH and conductivity as follows:
      (i) if the article has a zeta potential of −7.5 mV or less, then the contacting liquid has pH greater than 7 and a conductivity of about 5 to 9,000 microSiemens per centimeter; and
      (ii) if the article has a zeta potential of greater than −7.5 mV, then the contacting liquid has a pH of 7 or less and a conductivity of 5 to 5,500 microSiemens per centimeter; and
   (c) drying the article.

2. The method of claim 1, wherein the aqueous liquid has a conductivity of 7 to 3,000 microS/cm.

3. The method of claim 1, wherein the aqueous liquid has a conductivity of 10 to 1,000 microS/cm.

4. The method of claim 1, wherein the polymeric article contains an N-substituted amino aromatic additive that has a proton affinity greater than 230 kcal/mol and an enthalpy of deprotonation greater than 335 kcal/mol, and wherein the aqueous liquid has a pH of 7 or less and a conductivity of 5 to 5,500 microS/cm.

5. The method of claim 1, wherein the polymeric article contains an amino-substituted aromatic additive that has an enthalpy of deprotonation of less than 335 kcal/mol and a proton affinity less than 230 kcal/mol, and wherein the aqueous liquid has a pH of greater than 7 and a conductivity of 5 to 9,000 microS/cm.

6. The method of claim 1, wherein the polymeric article includes a polymeric material that has a volume resistivity of $10^{14}$ ohm-cm or greater at room temperature.

7. The method of claim 6, wherein the volume resistivity is about $10^{16}$ ohm-cm or greater.

8. The method of claim 6, wherein the polymeric article is in the form of a nonwoven web that comprises fibers and that has a basis weight of about 2 to 500 g/m², that has a thickness of about 0.25 to 20 mm, and that has a solidity of about 1 to 25 percent.

9. The method of claim 8, wherein the nonwoven web has a basis weight of about 20 to 150 g/m² and has a thickness of about 0.5 to 2 mm and a solidity of about 3 to 10 percent.

10. The method of claim 1, wherein the polymeric article to be charged includes an additive that includes a compound of the formula 1 or 2 set forth below

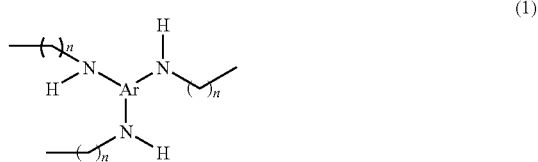

(1)

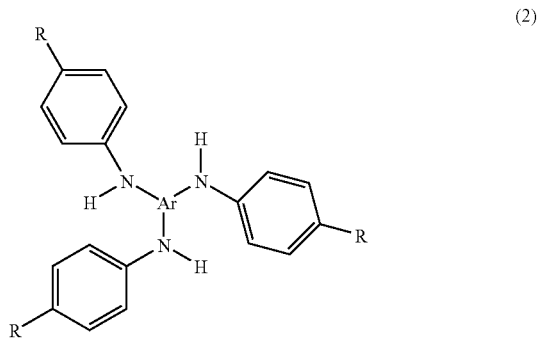

(2)

where Ar is a trivalent aromatic group substituted by 0 to 3 nitrogen atoms, n is an integer of 1 to 20, and each R independently may be a group that has less than about 20 non-hydrogen non-metallic atoms.

11. The method of claim 10, wherein each R may independently be hydrogen, halogen, an alkyl having 20 carbon atoms, a halogen substituted alkyl having 1 to 20 carbon atoms, an ester having 2 to 20 carbon atoms, a substituted amine that contains 2 to 20 carbon atoms, and combinations thereof.

12. The method of claim 1, wherein the aqueous liquid contains purified water.

13. The method of claim 1, wherein the aqueous liquid contains 60 percent water by volume.

14. The method of claim 1, wherein the aqueous liquid contains 80 percent water by volume and wherein the electret article is made by a continuous process where the pH is measured continuously.

15. The method of claim 1, wherein the drying step comprises a vacuum, heating, or a combination thereof.

16. The method of claim 1, wherein the polymeric article is a fibrous nonwoven web that contains microfibers that comprise polypropylene.

17. The method of claim 16, wherein the microfibers are meltblown microfibers.

18. A method of making a filter element, which comprises placing the nonwoven web of claim 16 into a filter cartridge or a mask body.

19. A method of making a respirator, which method comprises placing the nonwoven web of claim 16 into a mask body that is adapted to be worn over the nose and mouth of a person, the nonwoven web being disposed in the mask body such that air-to-be-filtered passes through the nonwoven web before being inhaled by a user of the respirator.

20. A method of making a fibrous electret article, which method comprises:
   (a) providing a nonwoven web that contains fibers that have a volume resistivity of $10^{14}$ ohm-cm or greater at room temperature; and
   (b) contacting the nonwoven web with an aqueous liquid that has a pH and conductivity as follows:
      (i) if the article has a zeta potential of $-7.5$ mV or less, then the contacting liquid has pH greater than 7 and a conductivity of about 5 to 9,000 microSiemens per centimeter; and
      (ii) if the article has a zeta potential of greater than $-7.5$ mV, then the contacting liquid has a pH of 7 or less and a conductivity of 5 to 5,500 microSiemens per centimeter; and
   (c) drying the nonwoven web.

21. The method of claim 20, wherein the nonwoven web contains microfibers and exhibits a quality factor of 1.5/ mmH$_2$O or greater.

22. The method of claim 21, wherein the exhibited quality factor is 2 mmH$_2$O$^{-1}$ or greater.

* * * * *